No. 801,695. PATENTED OCT. 10, 1905.
F. SKERL.
CASH REGISTER.
APPLICATION FILED OCT. 1, 1904.
20 SHEETS—SHEET 10.
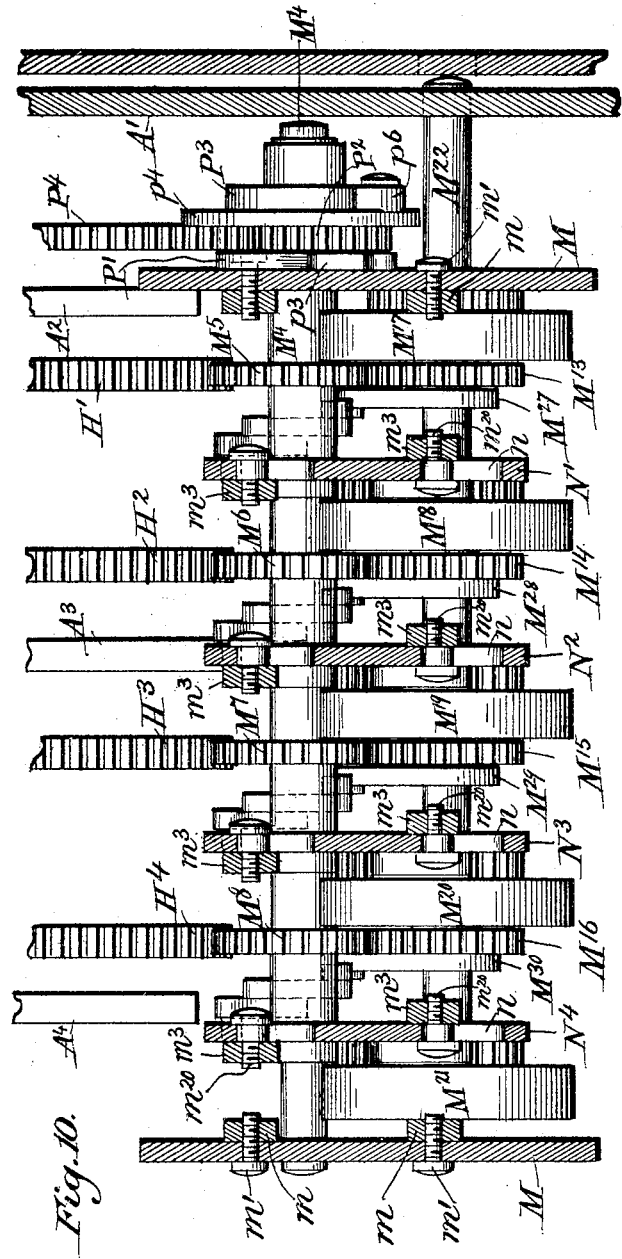
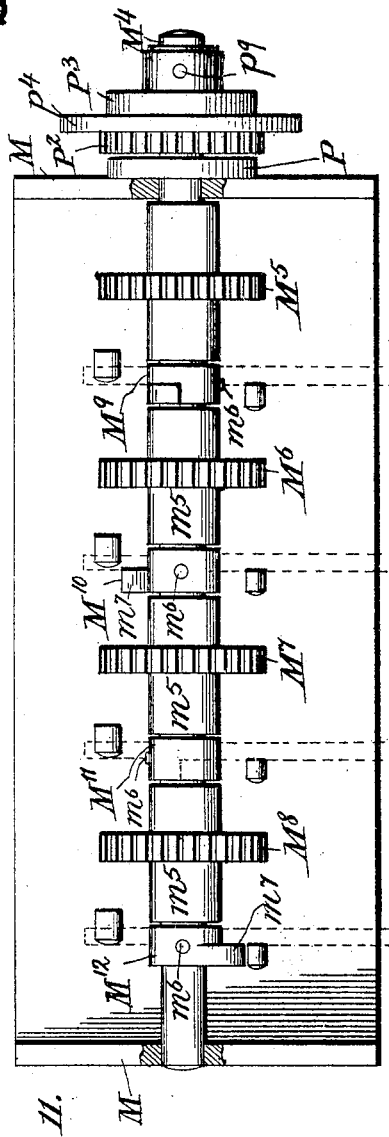

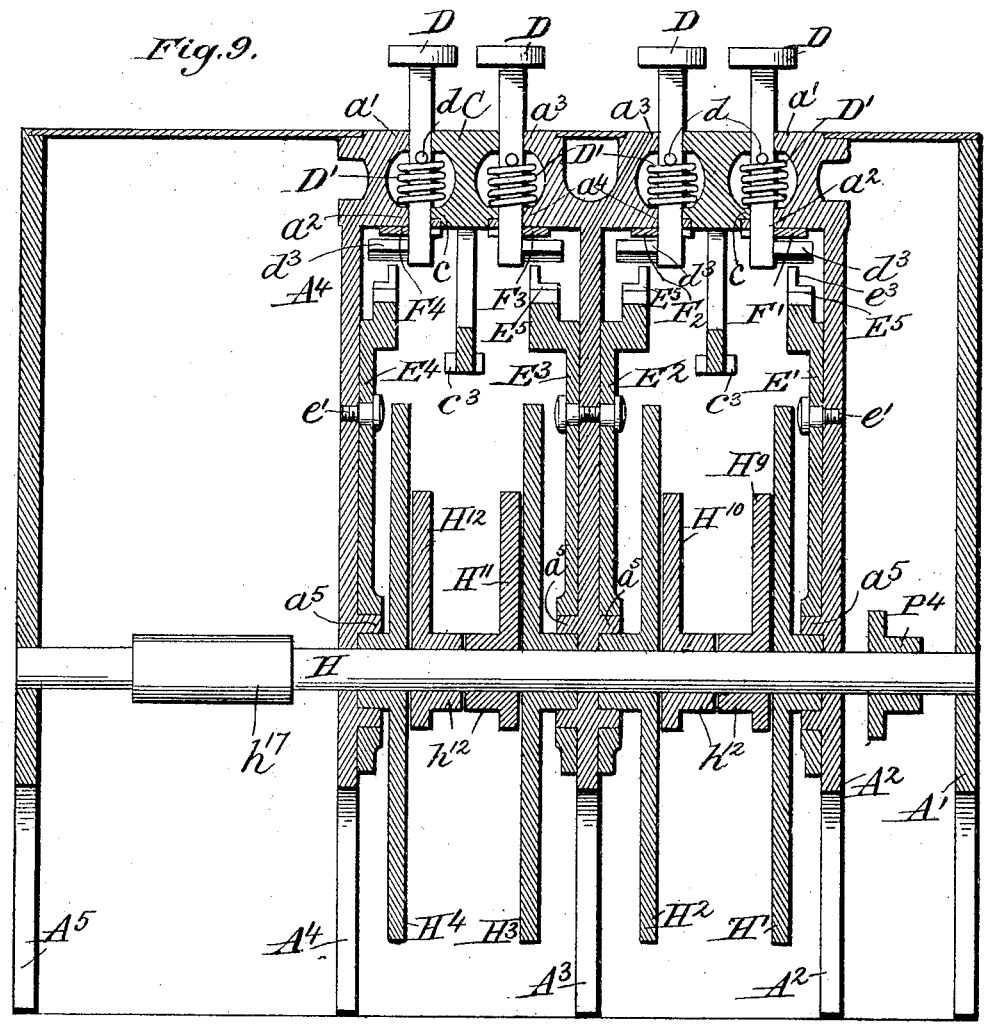

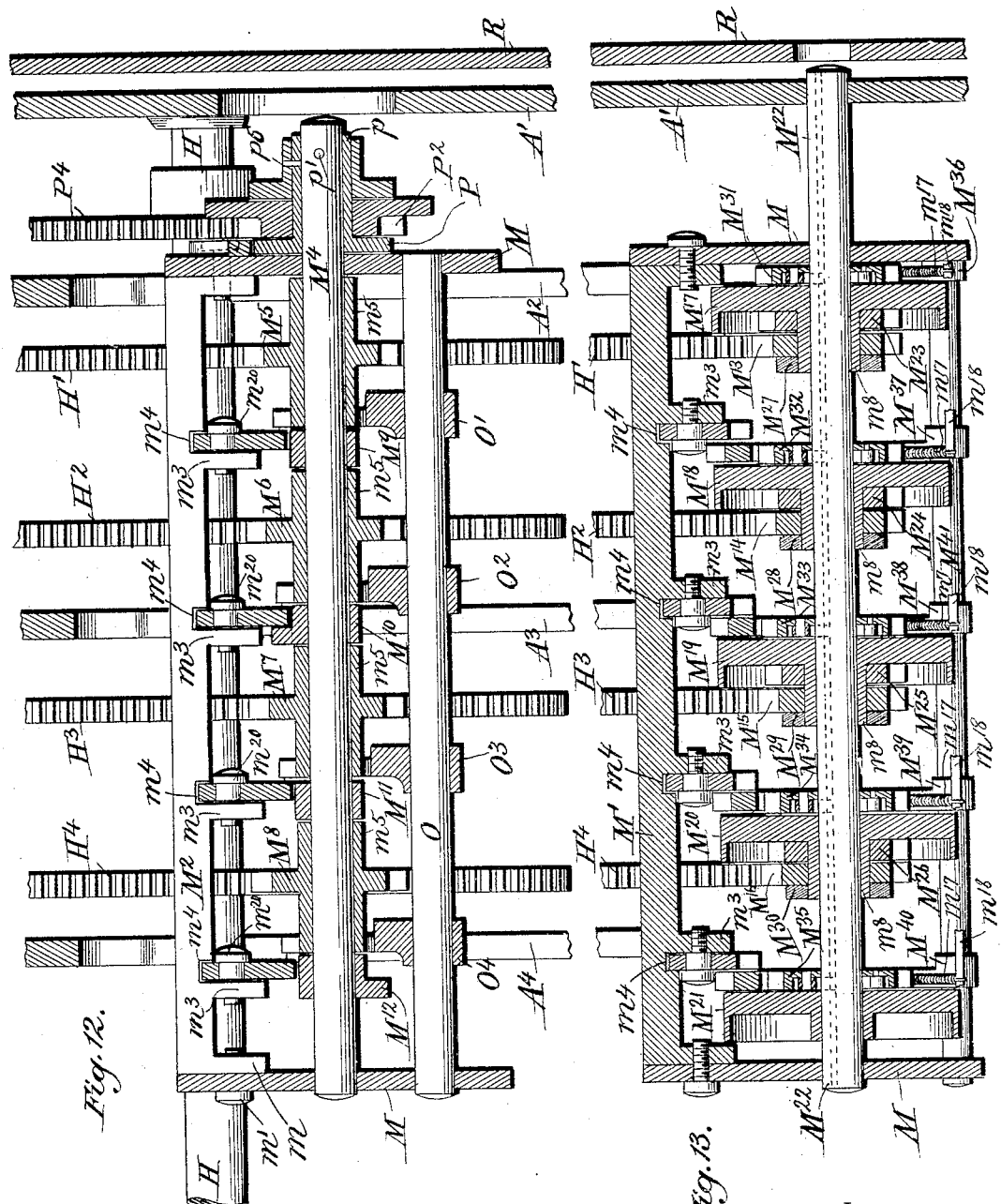

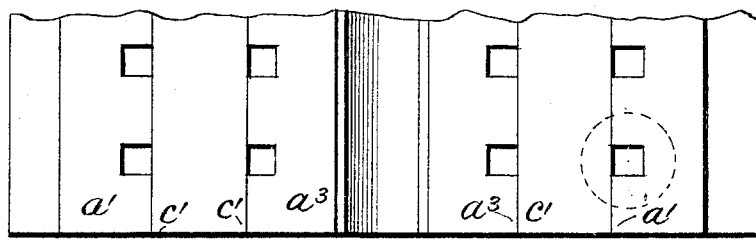
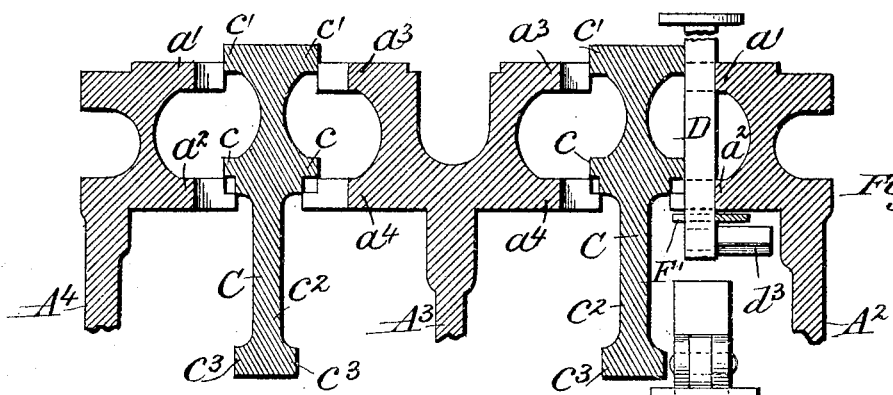
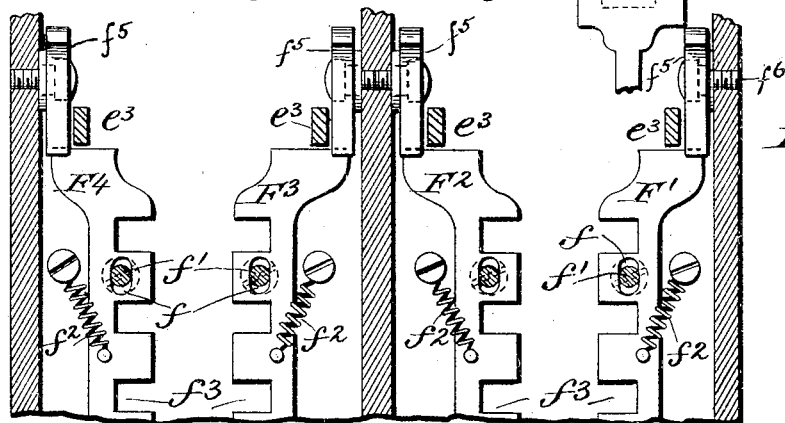
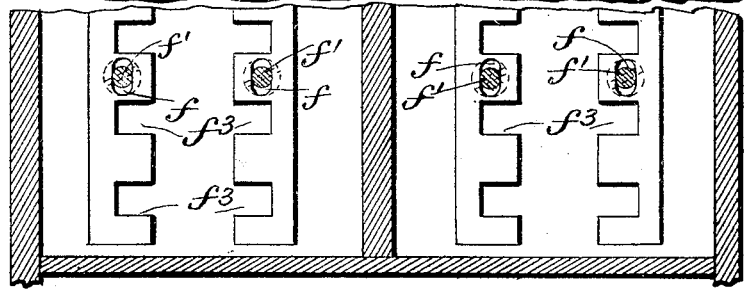

No. 801,695. PATENTED OCT. 10, 1905.
F. SKERL.
CASH REGISTER.
APPLICATION FILED OCT. 1, 1904.
20 SHEETS—SHEET 13.
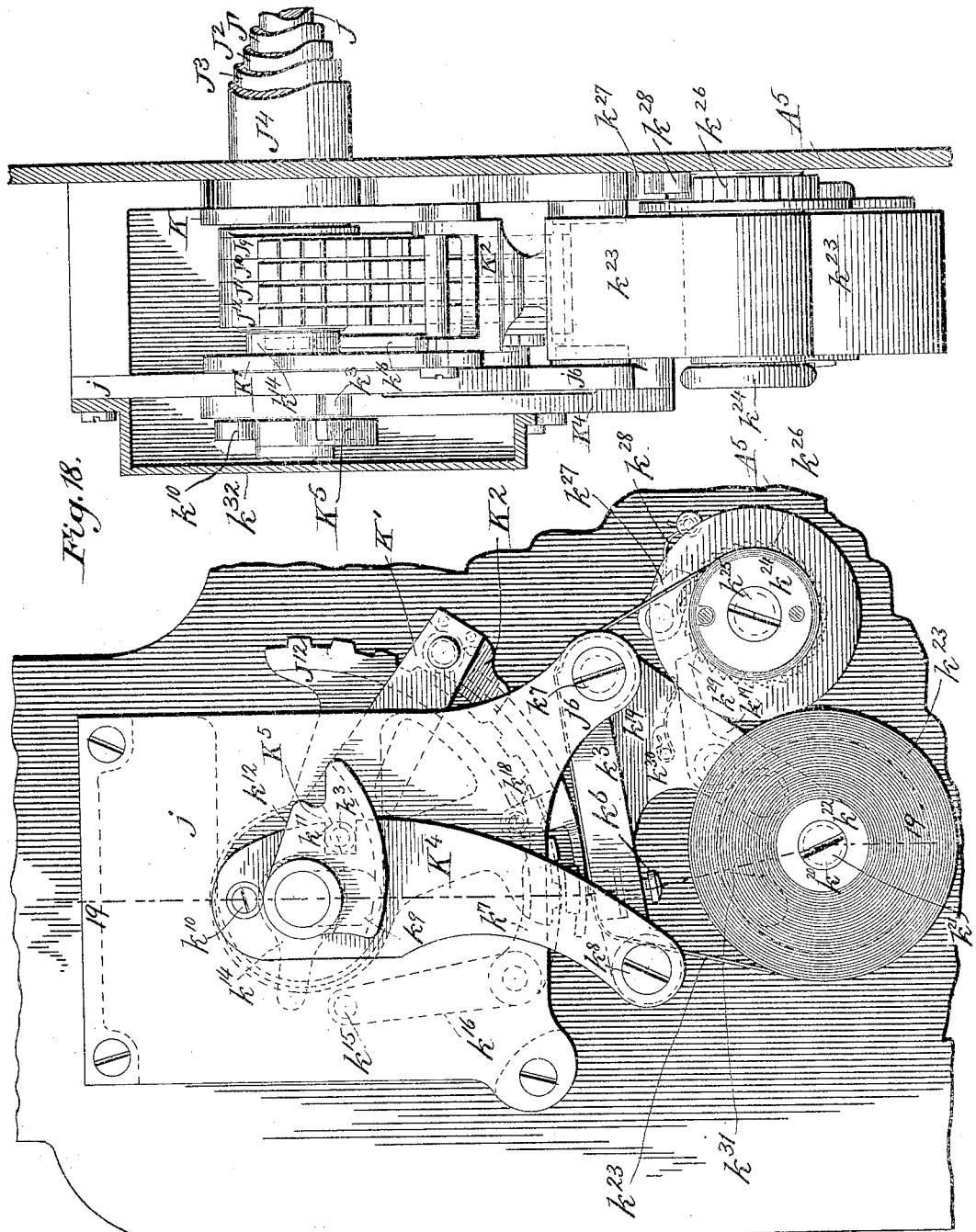
WITNESSES
INVENTOR
Francesco Skerl
By Georgii & Massie
his Attorneys.

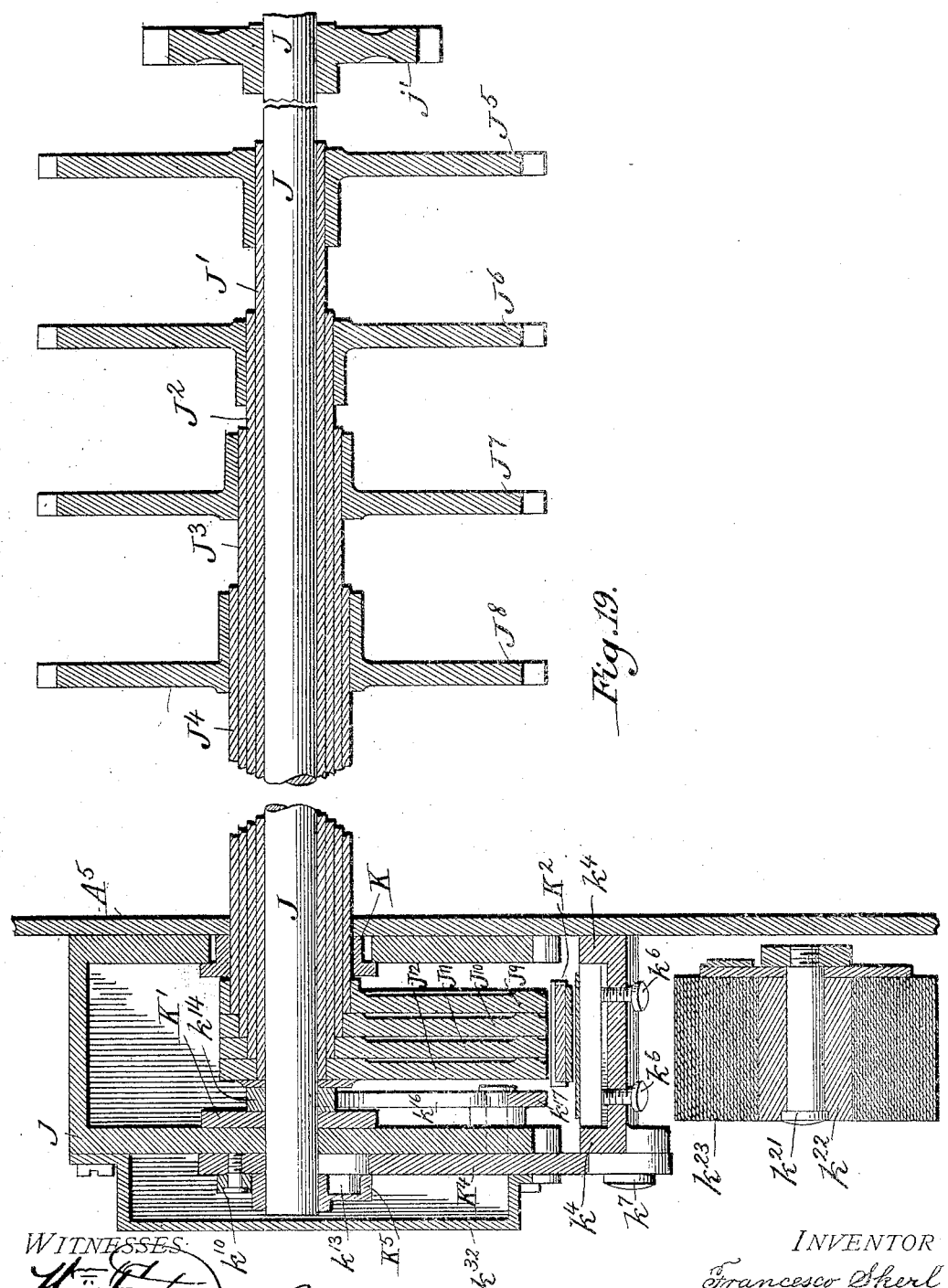

No. 801,695. PATENTED OCT. 10, 1905.
F. SKERL.
CASH REGISTER.
APPLICATION FILED OCT. 1, 1904.
20 SHEETS—SHEET 15.
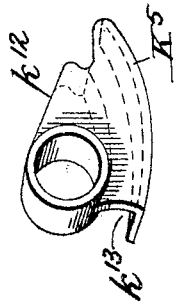
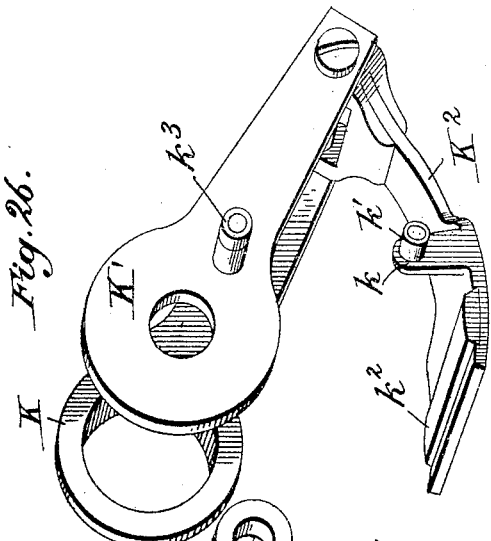
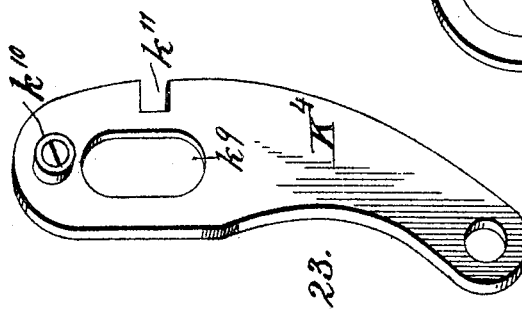
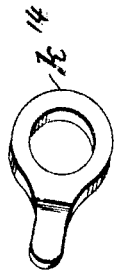
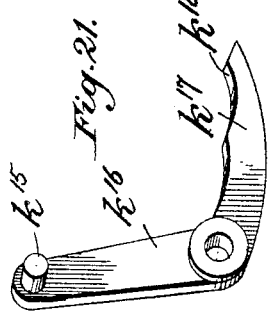
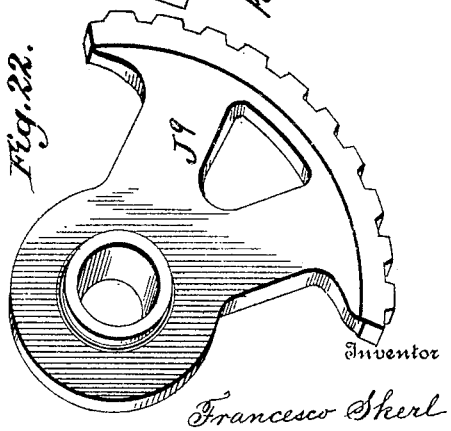
Witnesses
W. F. Doyle.
E. O. Hildebrand
Inventor
Francesco Skerl
By Georgii & Massie,
his Attorneys.

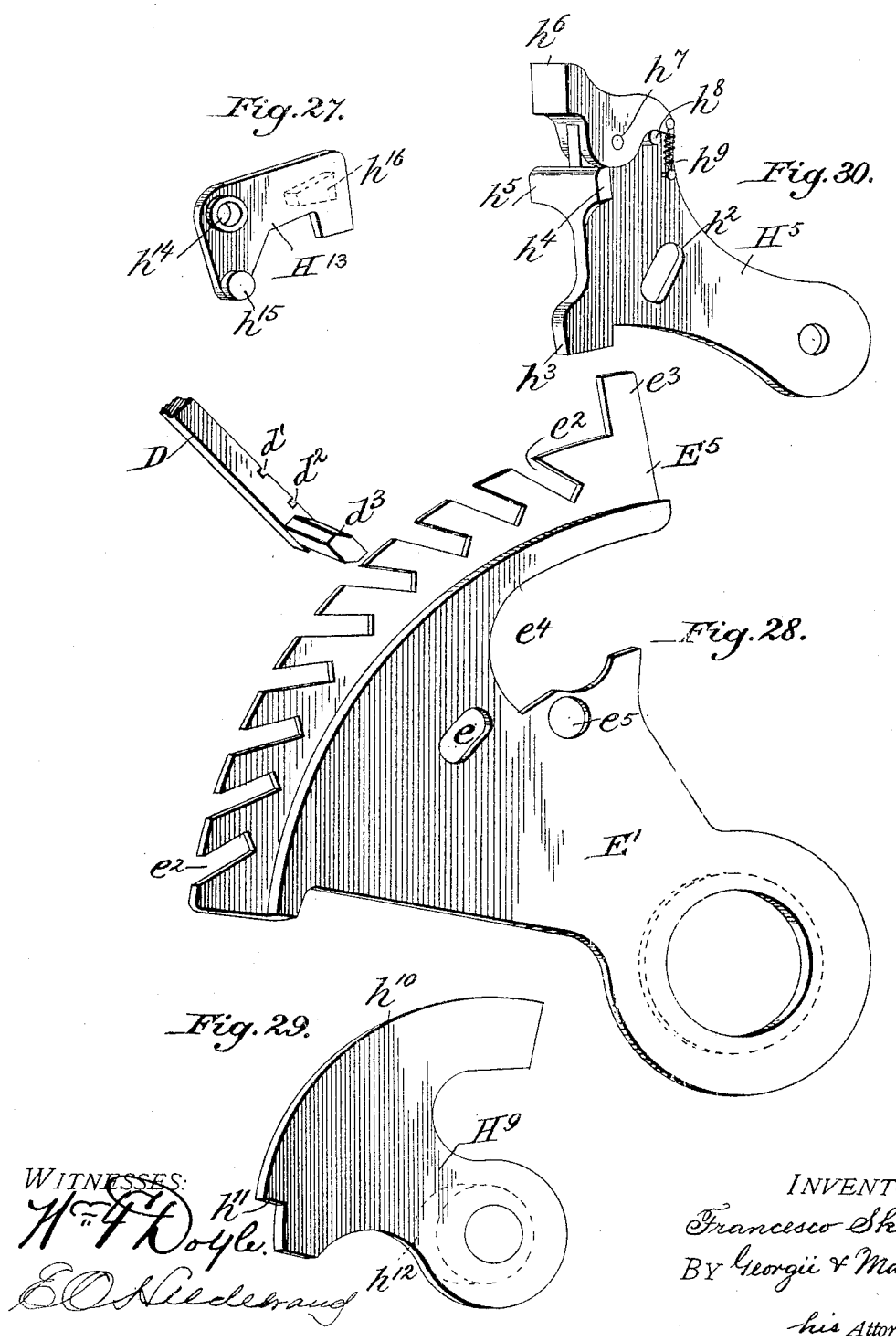

No. 801,695. PATENTED OCT. 10, 1905.
F. SKERL.
CASH REGISTER.
APPLICATION FILED OCT. 1, 1904.
20 SHEETS—SHEET 17.
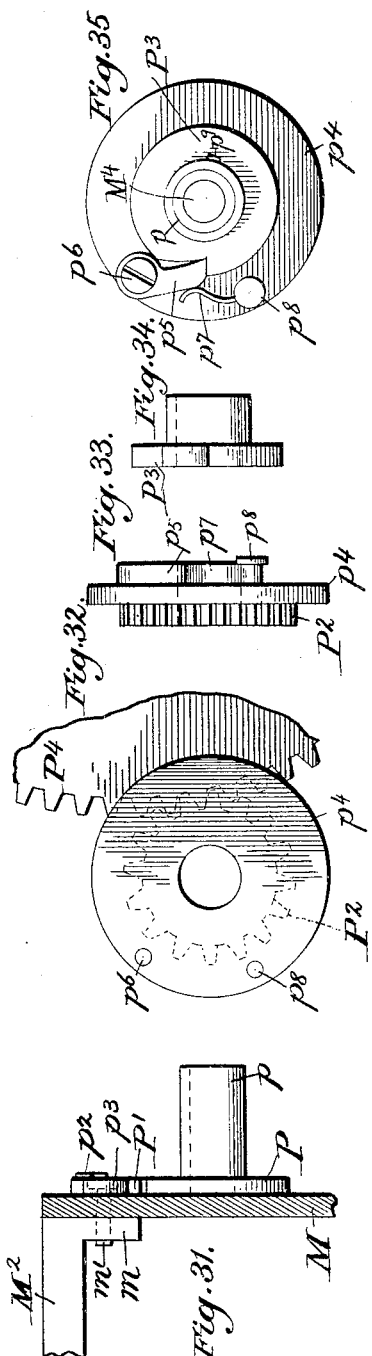
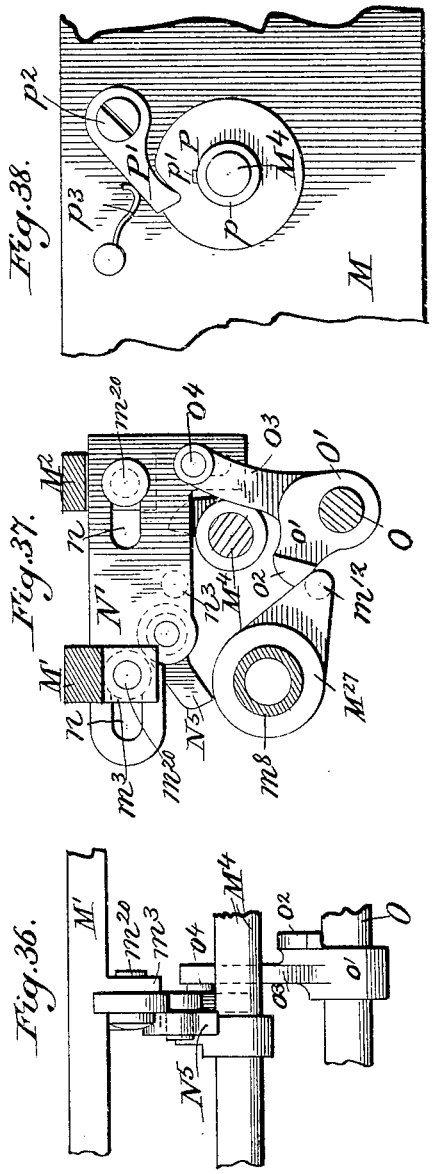
Witnesses
Wm F Doyle
EO Hildebrand
Inventor
Francesco Skerl
By Georgii & Massie
his Attorneys

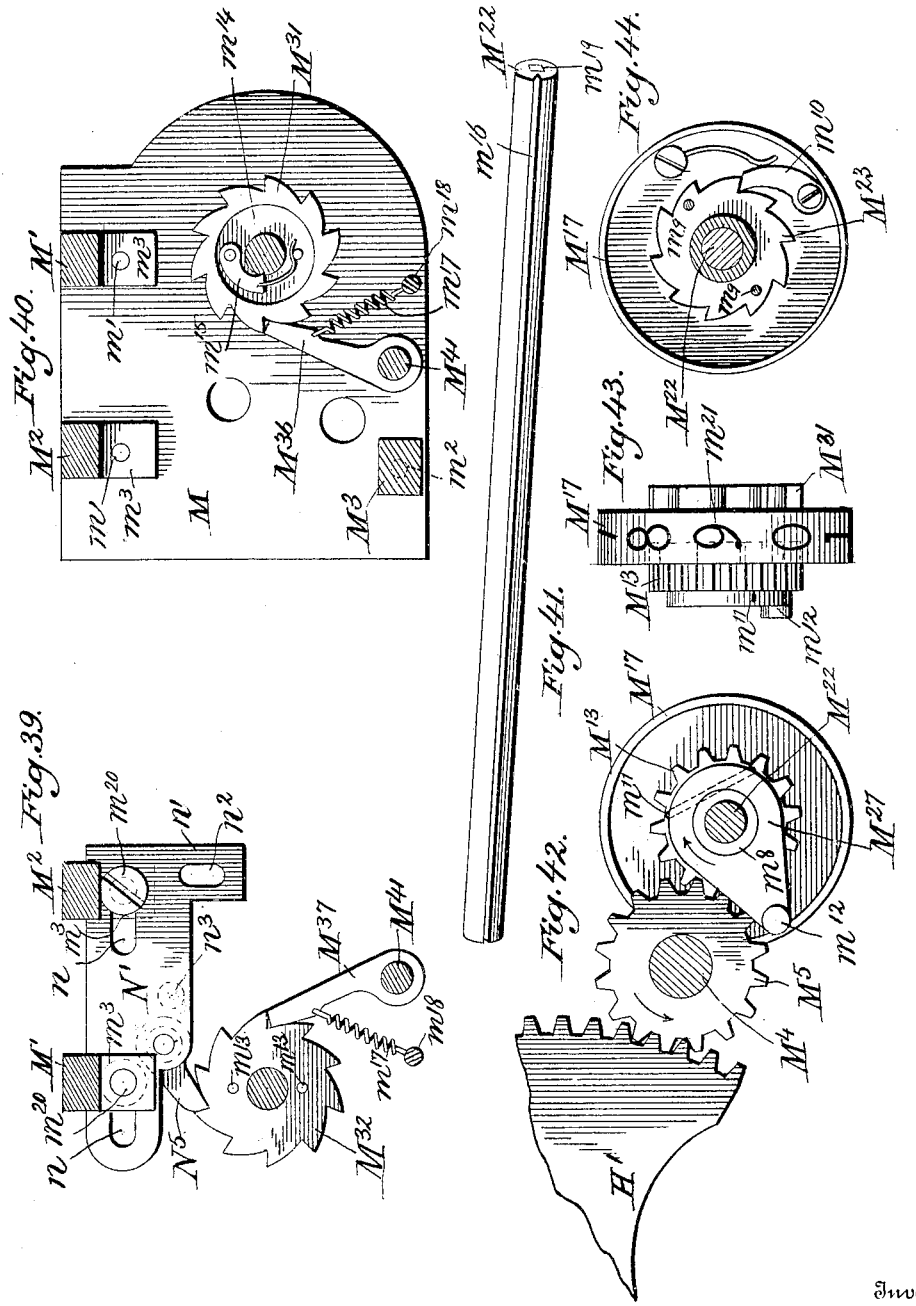

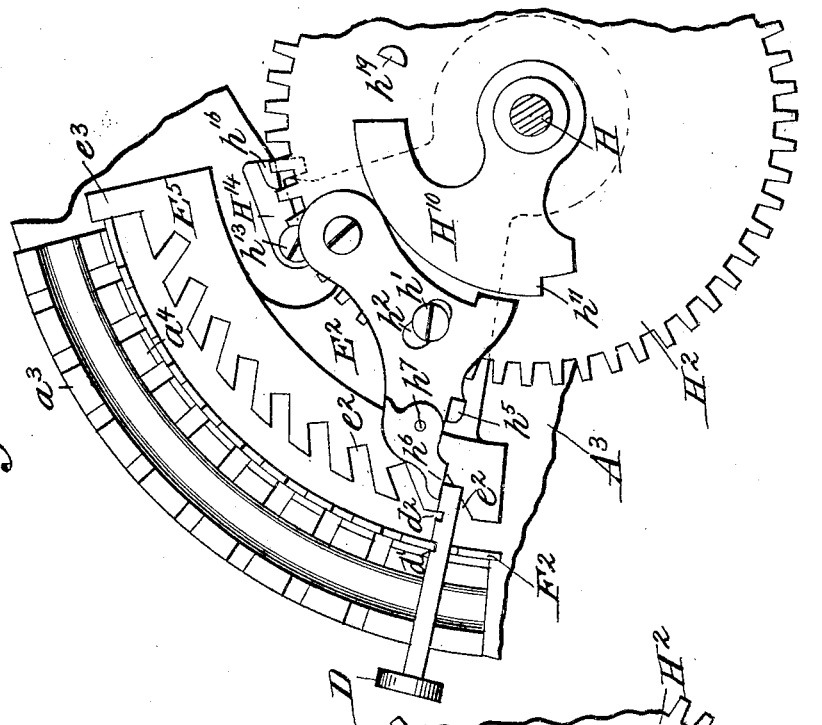
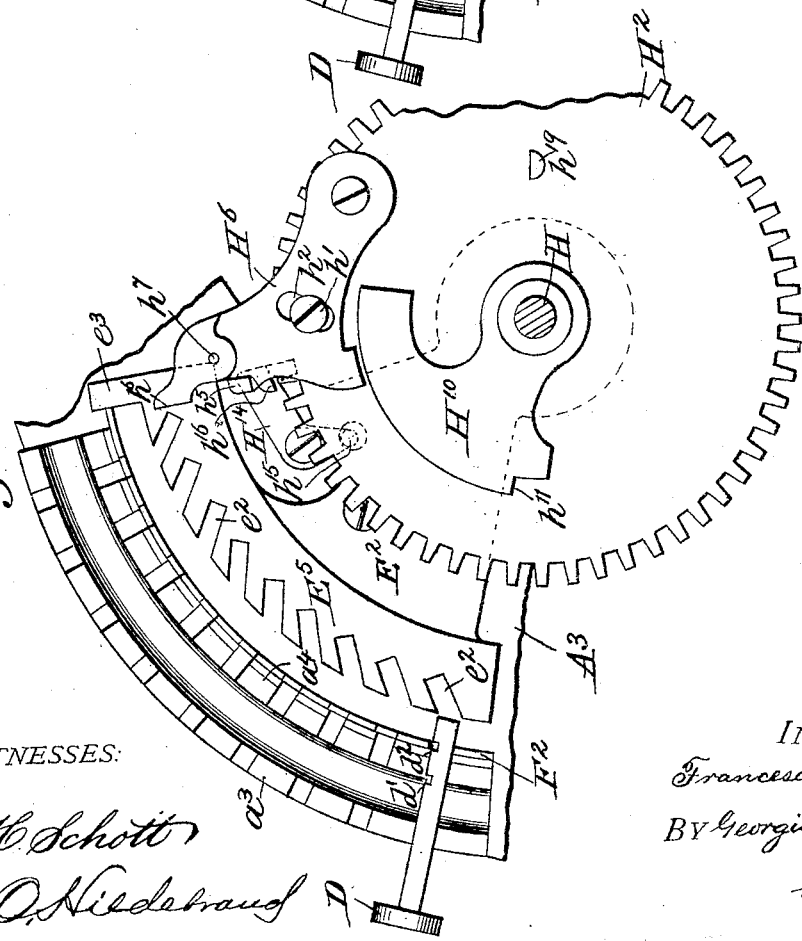

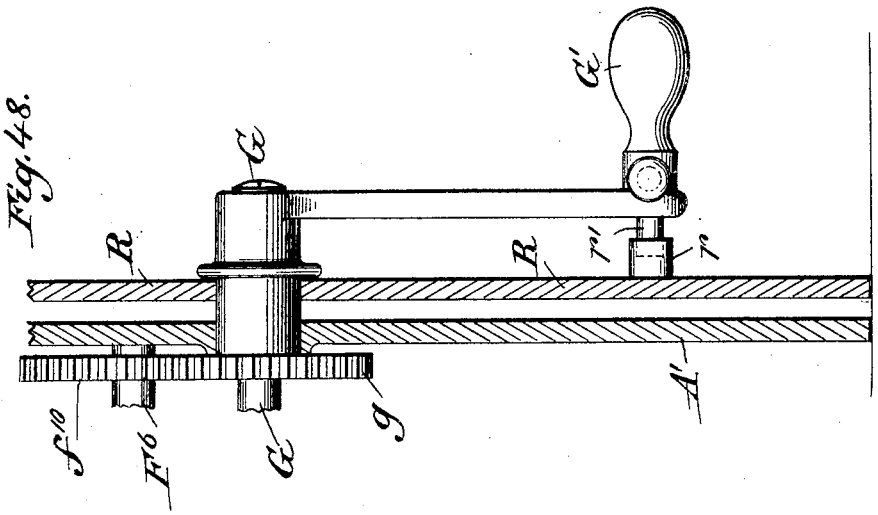
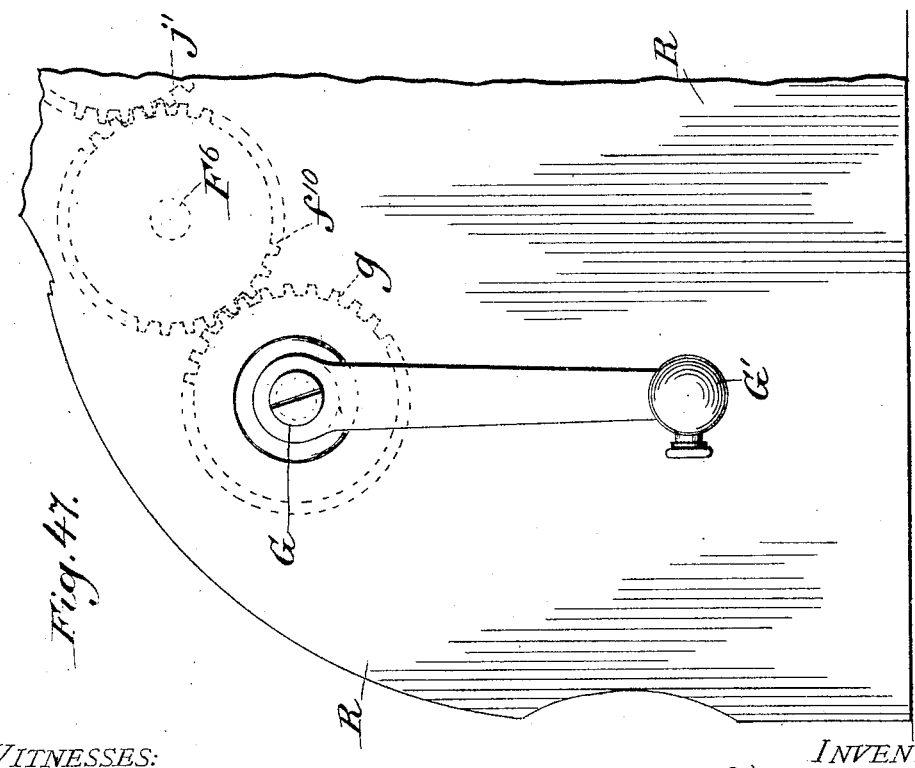

UNITED STATES PATENT OFFICE.

FRANCESCO SKERL, OF NEW YORK, N. Y.

CASH-REGISTER.

No. 801,695.　　　　Specification of Letters Patent.　　　　Patented Oct. 10, 1905.

Application filed October 1, 1904. Serial No. 226,845.

*To all whom it may concern:*

Be it known that I, FRANCESCO SKERL, a citizen of Austria-Hungary, residing at New York, in the county and State of New York, have invented certain new and useful Improvements in Cash-Registers; and I do hereby declare the following to be a full, clear, and exact description of the invention, such as will enable others skilled in the art to which it appertains to make and use the same.

My invention relates to improvements in cash-registers, and in particular to key-set crank-operated machines.

The general object of my invention is to provide a cash-register which will indicate the sales, print the amount of each sale on a control-strip, and add the total sales in an adding mechanism.

A further object of my invention is to provide a construction which will permit the machine to be constructed without the adding mechanism or the control-strip-printing mechanism, or both, and yet can be supplied readily with either or both of these mechanisms and without dismantling the machine, the said mechanisms being in the nature of attachments.

With these general objects in view and some others which will be obvious to those skilled in the art from the description hereinafter my invention consists in the features, details of construction, and combination of parts, which will first be described in connection with the accompanying drawings and then pointed out in the claims.

Figure 1:
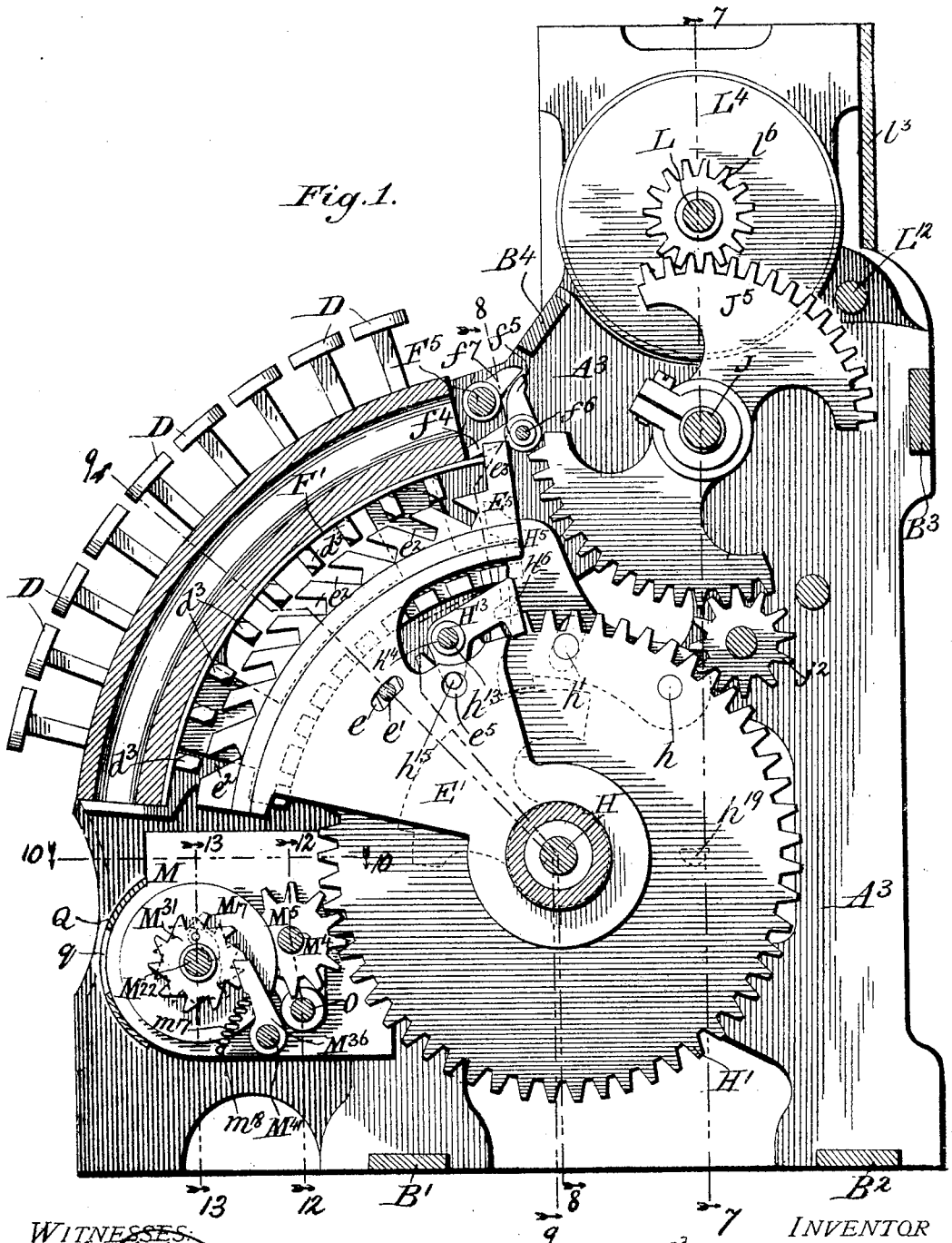
Figure 2:
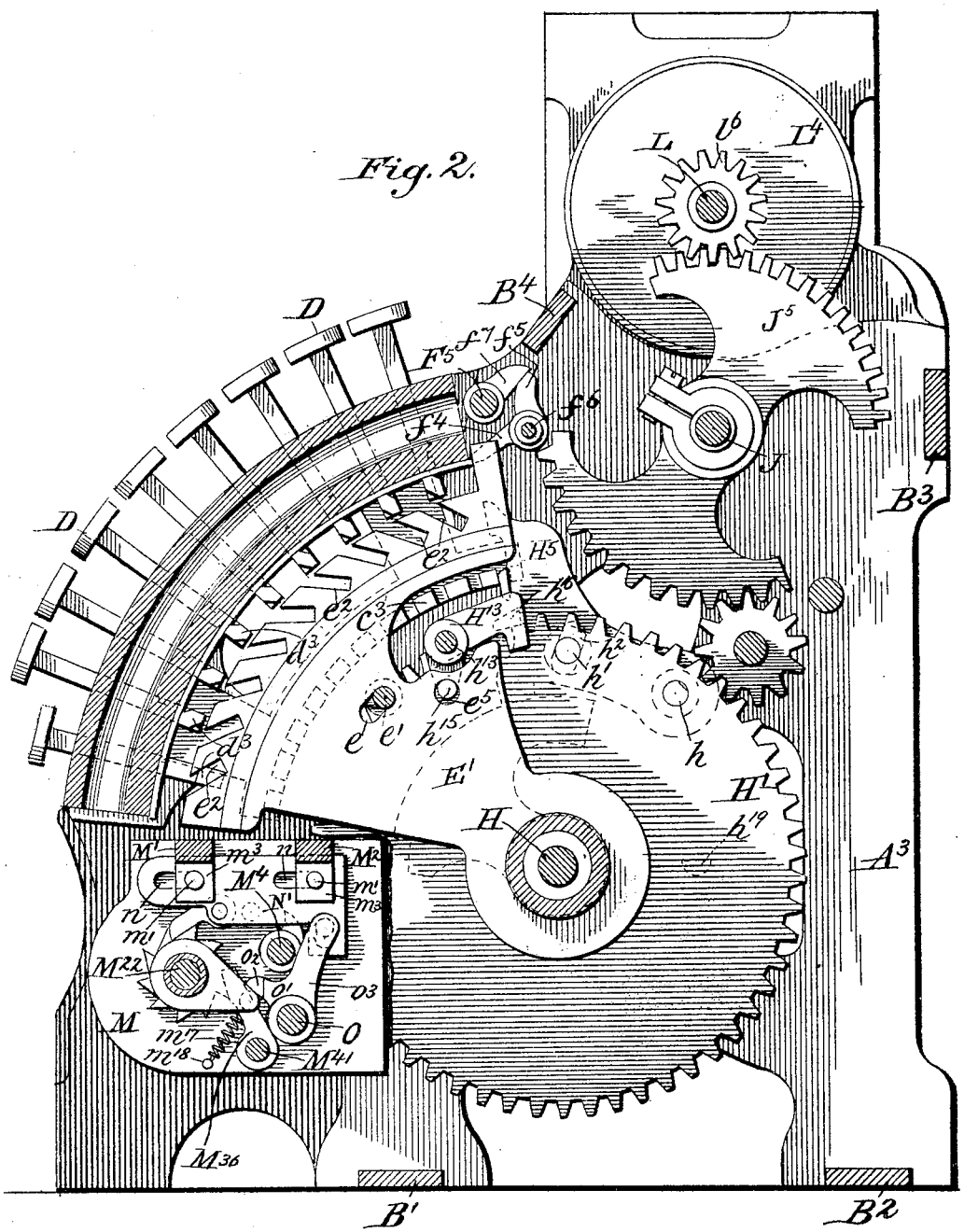
Figure 3:
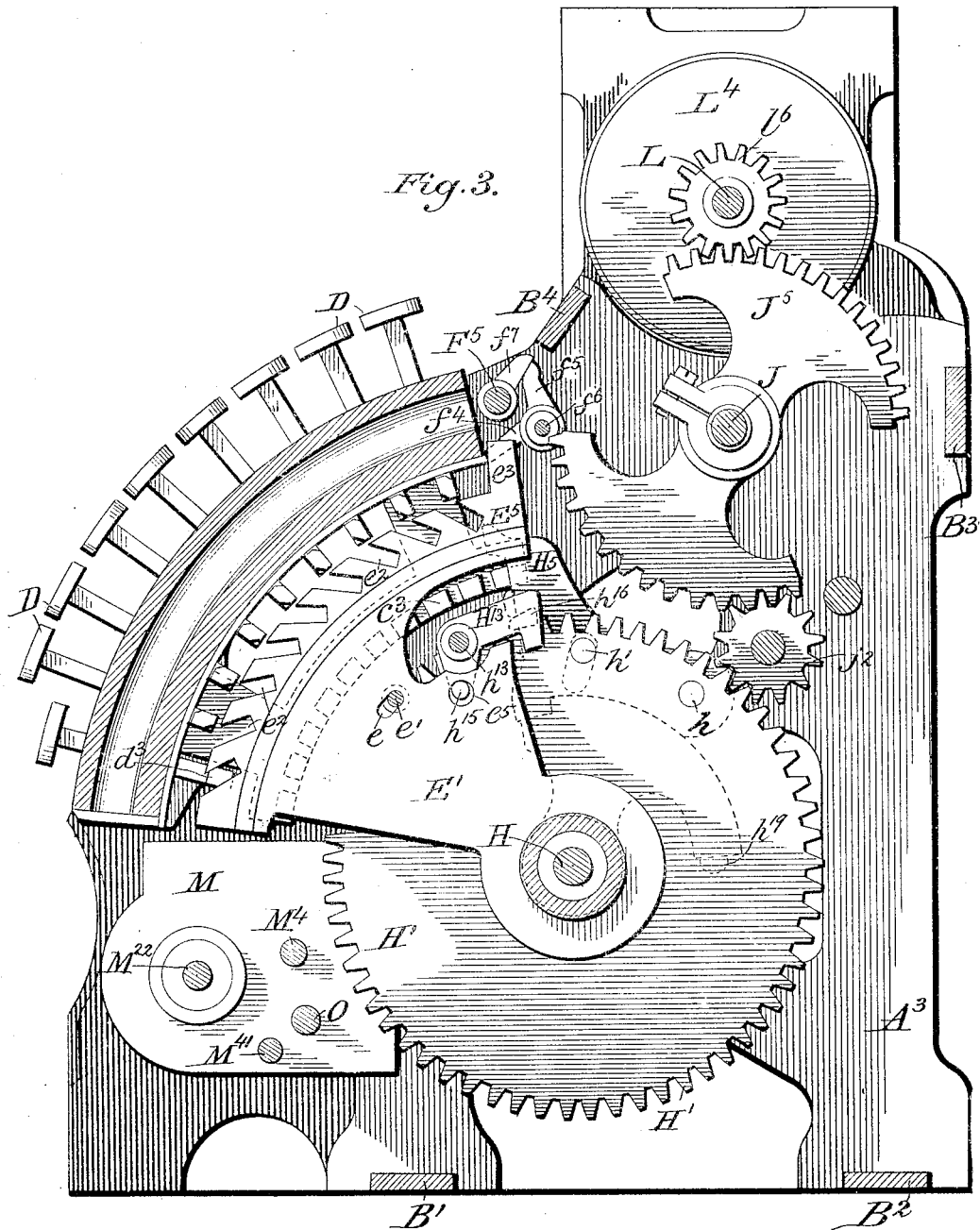
Figure 4:
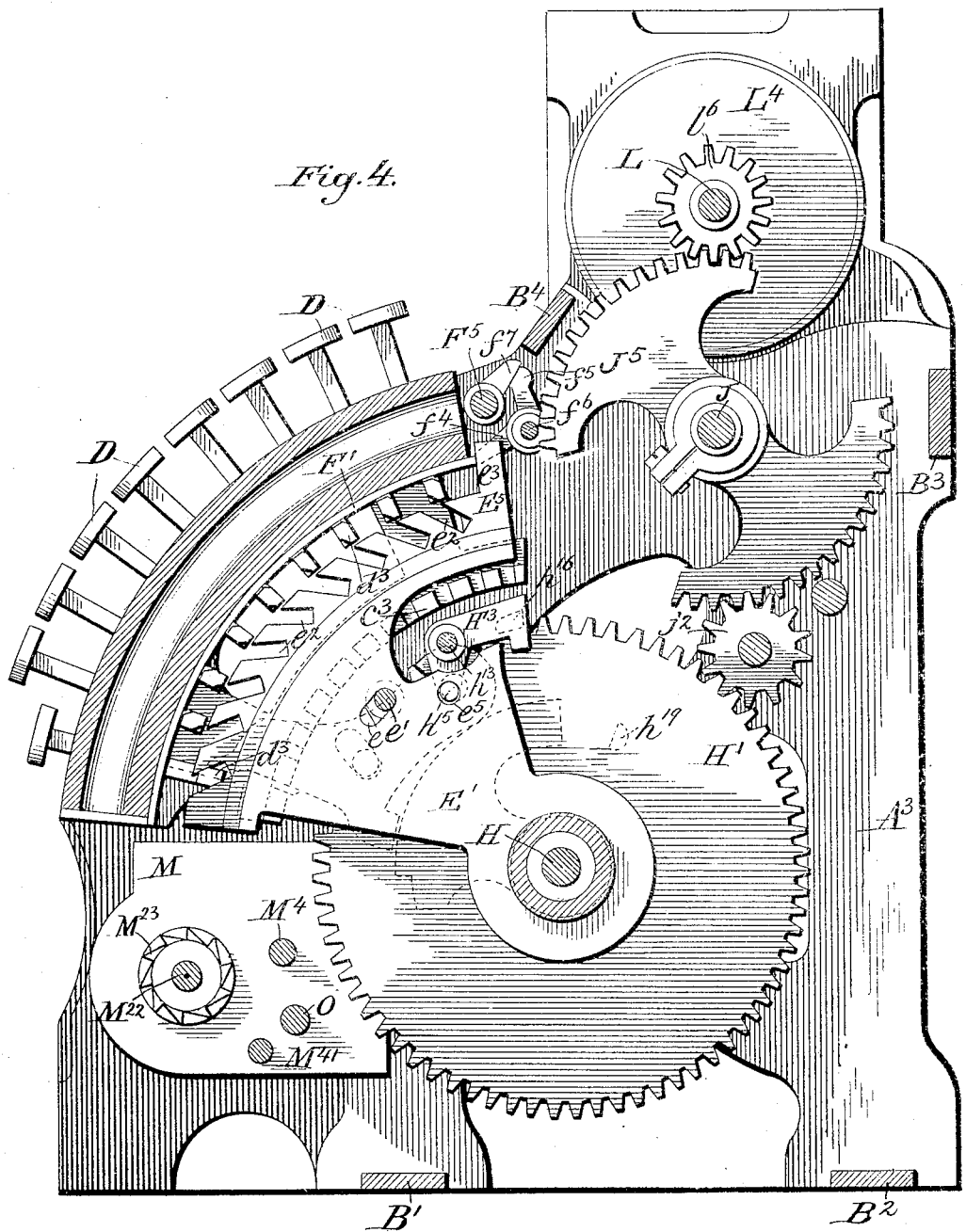
Figure 5:
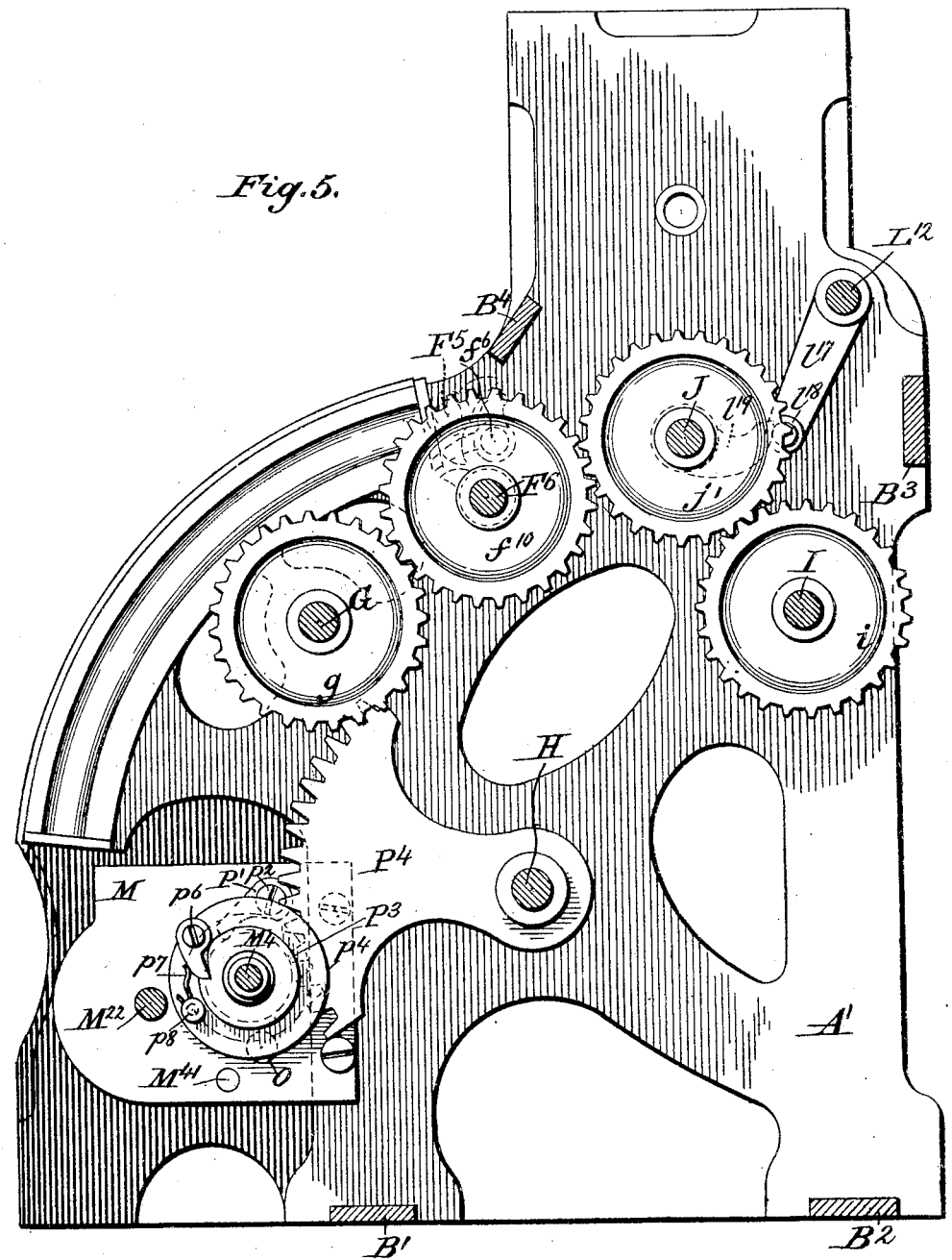
Figure 6:
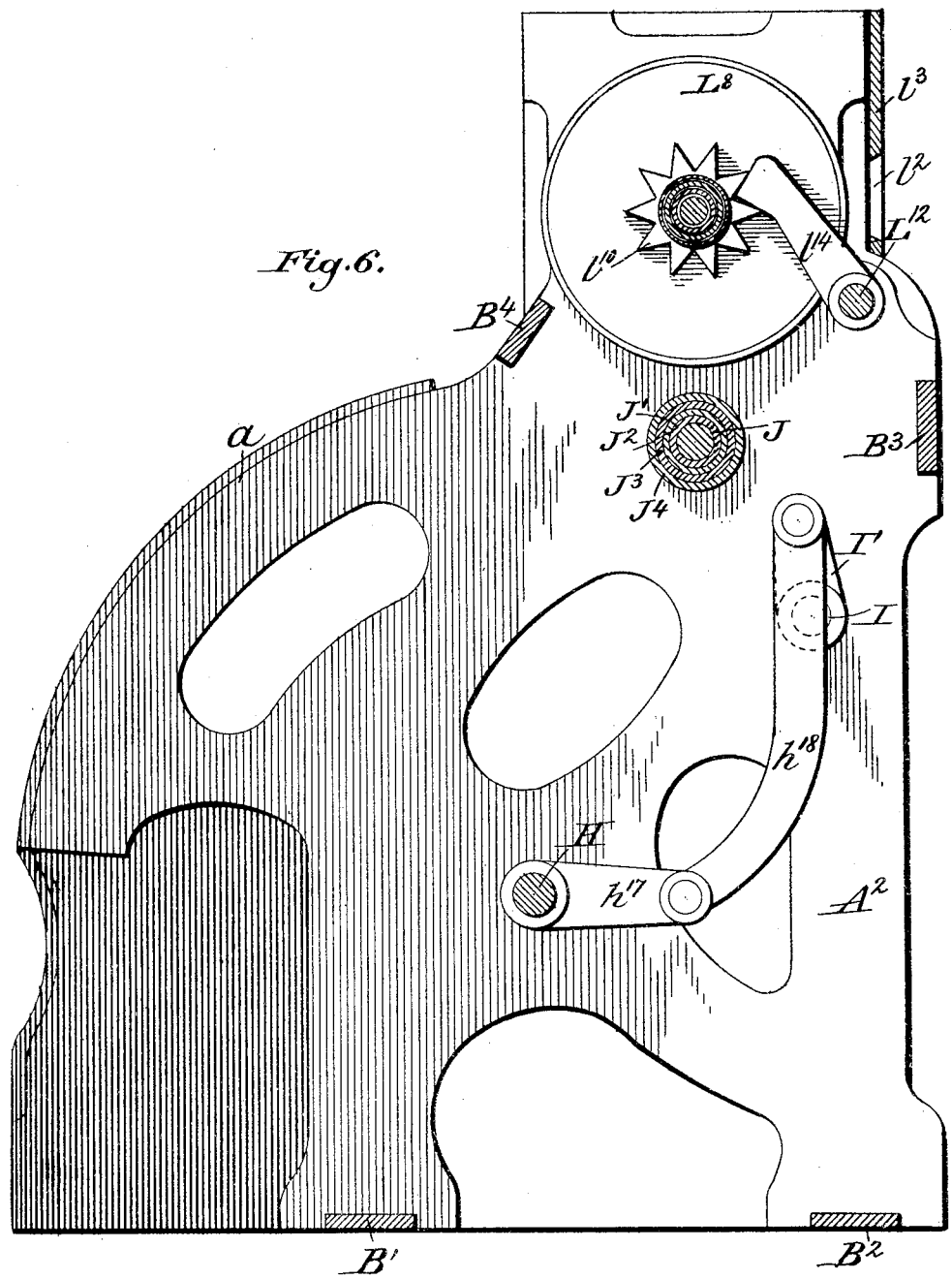
Figure 7:
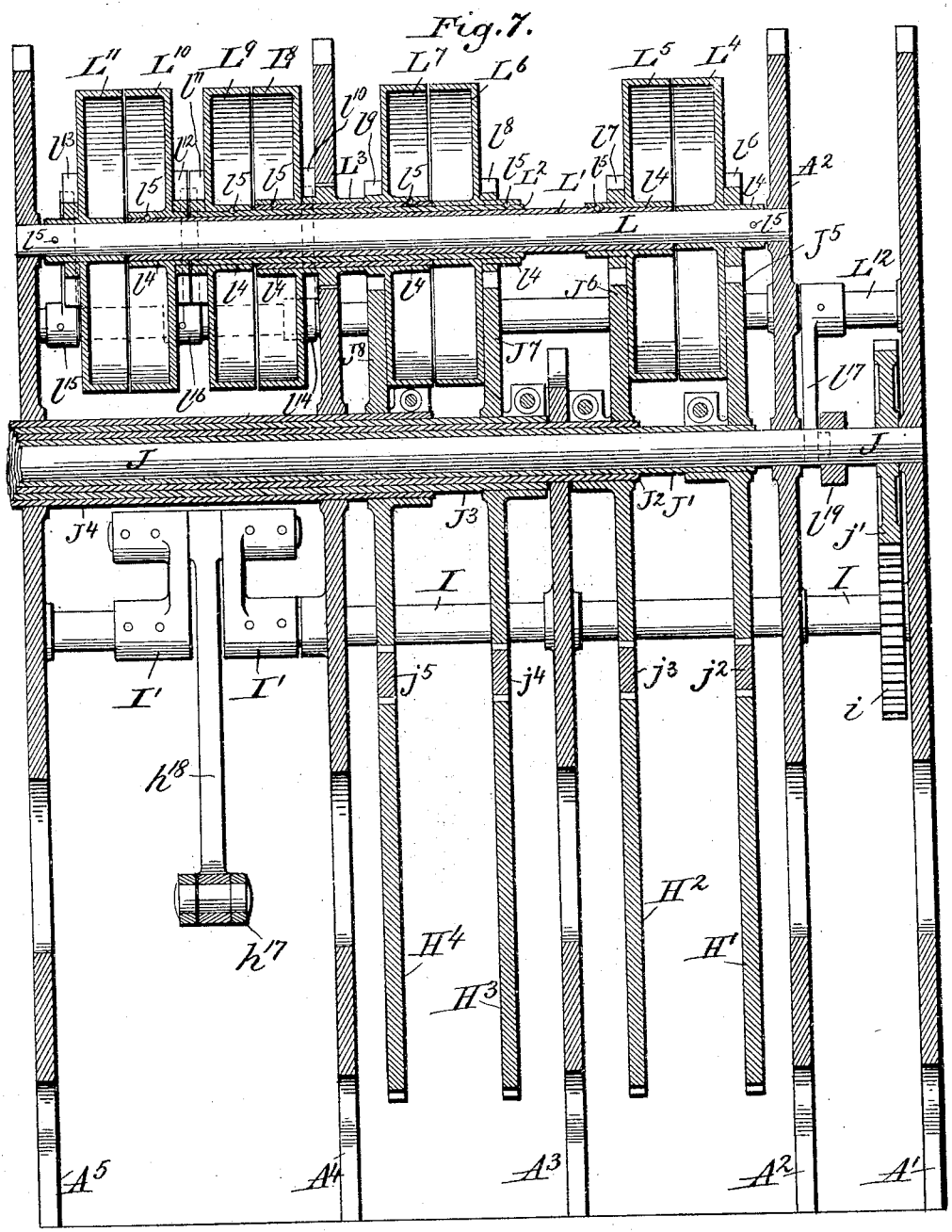
Figure 8:
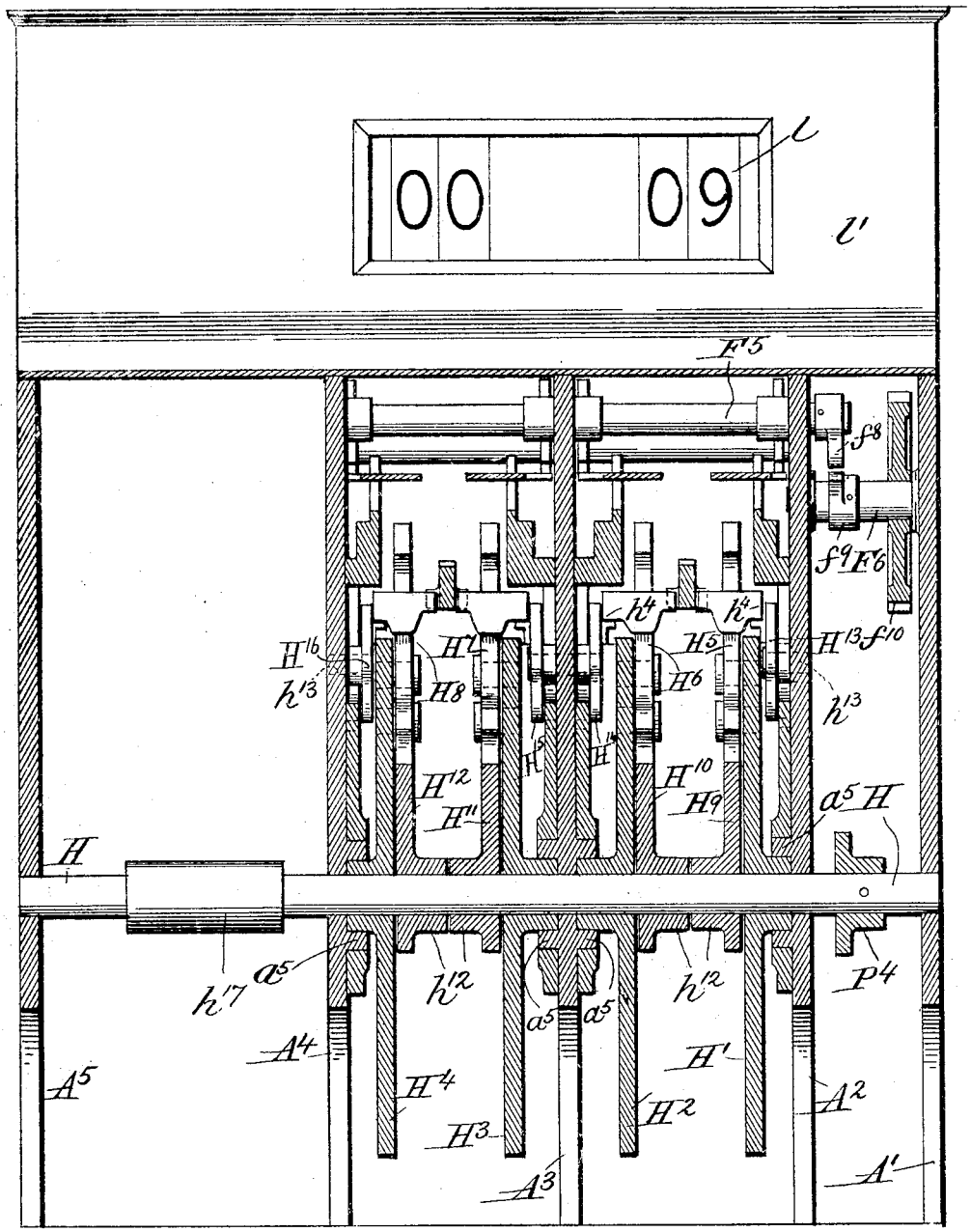

In the drawings, Figure 1 is a transverse section through a machine embodying my invention, the parts being shown in their initial positions; Fig. 2, a similar view with one of the keys depressed, a portion of one of the master gear-wheels and of the adding mechanism being removed; Fig. 3, a similar view showing the carrier in dotted lines at its extreme position toward the rear, a further portion of the adding mechanism being removed; Fig. 4, a similar view showing in dotted lines the position of the hammer and carrier when the latter has returned to its initial position and the hammer has been stopped by the depressed key; Fig. 5, a transverse section taken in front of the casing-standard $A^2$; Fig. 6, a transverse section taken in front of the casing-standard $A^5$; Fig. 7, a longitudinal section in the line 7 7, Fig. 1; Fig. 8, a longitudinal section on the line 8 8, Fig. 1; Fig. 9, a longitudinal section on the line 9 9, Fig. 1; Fig. 10, a horizontal longitudinal section on the line 10 10, Fig. 1, through the adding mechanism; Fig. 11, a detail view of a part of the adding mechanism; Fig. 12, a vertical longitudinal section on the line 12 12, Fig. 1, through the adding mechanism; Fig. 13, a similar view on the line 13 13, Fig. 1, through the adding mechanism; Figs. 14, 15, and 16, detail plan, section, and bottom plan views, respectively, of the keyboard and locking-plates; Fig. 17, an end elevation of the recording mechanism; Fig. 18, a side elevation of the same; Fig. 19, a longitudinal section of the recording mechanism on the line 19 19, Fig. 17; Figs. 20 to 26, inclusive, detail perspective views of parts of the recording mechanism referred to hereinafter; Figs. 27 to 30, inclusive, detail views of parts of the selecting mechanism hereinafter referred to; Figs. 31 to 44, inclusive, detail views of parts of the adding mechanism hereinafter referred to; Figs. 45 and 46, detail views of the master-wheel $H^2$ and its coöperating parts in two different positions, as explained hereinafter; and Figs 47 and 48, detail views of the crank-handle and its stop device.

Referring to the drawings, and in particular to Fig. 7, $A'$, $A^2$, $A^3$, $A^4$, and $A^5$ are casing-standards, one of which—viz., $A^3$—does not extend as high as the others. These standards are held at the proper distance apart by means of casing-strips $B'$ $B^2$ $B^3$ $B^4$, Figs. 1 to 6. The standards are each provided with a curved portion toward the front of the machine, as understood by those skilled in the art and as shown at $a$, Fig. 6. The standards $A^2$ and $A^4$ are each provided along their curved parts with a pair of inward-extending flanges, the flanges $a'$ $a^2$ of each pair being arranged one above the other, as shown in Figs. 9 and 15. The standard $A^3$ is provided along its curved surface with two pairs of flanges similar to the flanges $a'$ $a^2$, the pairs extending in opposite directions, as shown in Fig. 9, the upper flanges of each pair being indicated at $a^3$ and the lower flanges at $a^4$. The lower flanges $a^2$ $a^4$ of the standards $A^2$ $A^3$ $A^4$ are rabbeted, and in these rabbets rest the lower flanges $c$ of curved guide-strips C, which have two pairs of oppositely-projecting flanges $c\,c'$. (See Fig. 15.) Each curved guide-strip C is provided with a downward-extending rib $c^2$, having oppositely-extending locking-flanges $c^3$ at its lower end, each of said locking-flanges having ten locking-notches, as shown in Fig. 2, the purpose of which will be explained hereinafter.

The upper and lower flanges of the standards $A^2$ $A^3$ $A^4$ are provided with polygonal (in the present case square) slots, (see Fig. 9,) into which are inserted the keys D, each key having a polygonal stem which, in connection with the polygonal slot, makes the keys non-rotatable. Each key is pressed yieldingly by a spring D', Fig. 9, which bears at its lower end against the corresponding flange $a^2$ $a^4$, respectively, and at its upper end against a pin $d$, which is inserted in the respective key, this pin also serving to limit the upward movement of the key. The stem of each key is provided with an upper notch $d'$ and a lower notch $d^2$, Fig. 28. The keys are arranged in sets, each set consisting of nine keys arranged in a row, the first set at the right being the units-keys, the next set the tens-keys, and so on, as will be fully understood by those skilled in the art. In the structure shown in the drawings four sets of keys are employed; but it is to be understood that my invention is not limited to the use of that particular number of sets. Each key is provided with a laterally-extending pin $d^3$, preferably having two of its surfaces inclined, as will be clear from the end view of the pins shown in Figs. 1 and 28.

The casing-standards $A^2$ $A^4$ are provided with inward-extending annular flanges, and the casing-standard $A^3$ is provided with oppositely-extending similar flanges, as indicated at $a^5$, Fig. 9. These annular flanges serve as bearings for oscillating sectors E' $E^2$ $E^3$ $E^4$, a detail view of one being shown in Fig. 28. Each sector is provided with a slot $e$, through which extends a screw $e'$, Fig. 1, threaded into the respective casing-standard and serving to limit the oscillating movement of the respective sector. The upper edge of each sector is provided with a fin $E^5$, Fig. 28, slightly offset from the body of the respective sector, so that said fin will be immediately under the laterally-projecting pins $d^3$ of the corresponding set of keys. Each fin $E^5$ is provided with nine inclined slots $e^2$, each arranged to receive the pin $d^3$ of its respective key of the corresponding set, whereby when a key is depressed its pin $d^3$ will enter the corresponding inclined slot $e^2$ of the sector, and thereby the said sector will be oscillated to a predetermined extent. The rear end of each sector-fin $E^5$ has an upward-extending lug $e^3$, the purpose of which will be hereinafter pointed out.

To the under side of each lower flange $a^2$ $a^4$ of the casing-standards $A^2$ $A^3$ $A^4$ is movably attached a segmental locking-plate F' $F^2$ $F^3$ $F^4$, a bottom plan view of said plates being shown in Fig. 16. Each locking-plate is provided with a pair of slots through which pass screws $f'$, threaded into the respective lower flange of the corresponding casing-standards. By means of these screws and slots the locking-strips are held in place and yet are permitted a limited amount of longitudinal movement. To each locking-strip is attached one end of a spring $f^2$, which tends to press its locking-strip yieldingly against the respective lug $e^3$ of the corresponding sector. The other ends of the said springs are secured to the casing-standards. Each locking-strip is provided with a series of key-notches $f^3$, through which project the stems of the respective keys D. When a key is depressed and the corresponding sector E' $E^2$ thereby oscillated, the lug $e^3$ of such sector will push forward the corresponding locking-strip F' to $F^4$ against the tension of its spring $f^2$, and thereby cause the locking-strip to enter the upper notch $d'$ of the depressed key and the lower notches $d^2$ of the remaining keys of its set, whereby the depressed key is locked against upward movement and the remaining keys of the set are locked, so that they cannot then be depressed. In order to retain the locking-strips in their locked positions, a detent is located at the rear end of each locking-strip, each of these detents having an arm $f^4$ and an arm $f^5$ at an angle to the arm $f^4$, each of the detents being pivotally mounted on a screw $f^6$, threaded into the respective casing-standards, as shown in Fig. 1. When a locking-strip is moved forward to lock its set of keys, as already described hereinabove, the arm $f^4$ of the respective detent drops down behind the end of the said locking-strip, and thereby prevents said locking-strip from moving backward to its normal position. The extent to which the arm $f^4$ of a detent may drop is limited by the other arm $f^5$ of said detent coming into contact with a corresponding trip-arm $f^7$, mounted on trip-shaft $F^5$, journaled in the casing-standards $A^2$ $A^3$ $A^4$, and having one end projecting outside the standard $A^2$, as shown in Fig. 8, this projecting end being provided with a cam $f^8$, arranged to be engaged by a corresponding cam $f^9$, fixed to a short cam-shaft $F^6$, journaled in the casing-standards A' $A^2$, and provided with a gear-wheel $f^{10}$, in mesh with a gear-wheel $g$, Fig. 5, fixed on a crank-shaft G, which is journaled in the casing-standard A' $A^2$, the projecting end being provided with a crank-handle G', Figs. 47 and 48, by means of which the entire apparatus is operated, as more fully described hereinafter.

An oscillating shaft H extends through and is journaled in the casing-standard A' to $A^5$, concentric with the annular flanges $a^5$ on which the oscillating sectors E' $E^4$ are journaled, and upon this shaft H are loosely journaled gear-wheels H' $H^2$ $H^3$ $H^4$, their hubs projecting within the said annular flanges $a^5$, as shown in Fig. 8. To each gear-wheel is attached a hammer $H^5$ $H^6$ $H^7$ $H^8$, one of which is shown in Fig. 30, each hammer being pivotally attached to its respective gear-wheel by a screw $h$, Fig.

1, and being limited in its oscillatory movement about said screw $h$ by a screw $h'$, threaded into the gear-wheel and passing through a slot $h^2$ in the said hammer. Each hammer has a downward-extending tooth $h^3$ at its front end and two oppositely-projecting lateral lugs $h^4$ $h^5$, Fig. 30. To the upper end of the hammer is pivotally secured a head $h^6$, connected to the hammer by a knuckle-joint, through which and through the hammer passes a pivot-pin $h^7$, the hammer being provided with a stop-pin $h^8$, which limits the rearward movement of the hammer-head $h^6$, a spring $h^9$, connected at one end to the hammer-head and at the other end to the hammer itself, serving to hold the hammer-head yieldingly in contact with said stop-pin $h^8$.

Upon the shaft H between the master gear-wheels H' H² H³ H⁴ are mounted carriers $H^9$ $H^{10}$ $H^{11}$ $H^{12}$, as shown in Fig. 8, one of said carriers being shown in detail in Fig. 29. As will be seen in the latter view, each carrier has an upper surface $h^{10}$, which may be termed the "back" of the carrier, concentric with the shaft H, and its front has a recess whereby the shoulder $h^{11}$ is formed. Each carrier is provided with a hub $h^{12}$, by which it may be pinned or otherwise secured to the shaft H.

Upon the inner faces of the casing-standards A² and A⁴ and upon both faces of the casing-standards A³ are pivotally mounted the dogs $H^{13}$ $H^{14}$ $H^{15}$ $H^{16}$, (see Fig. 8,) one of said dogs being shown in detail in Fig. 27. Each dog is pivotally attached to its casing-standard by means of a screw $h^{13}$ passing through a hole $h^{14}$ in the dog and threaded into the standard. The rear portion of each oscillatory sector E' E⁴ is cut away, as indicated at $e^4$, Fig. 28, to allow said segment to clear the dog, as will be clear from Fig. 1. Each dog has two arms, one of which is provided with a laterally-extending pin $h^{15}$, which enters an opening $e^5$ in its respective oscillatory sector. The other arm has on its side opposite the pin $h^{15}$ a laterally-projecting lug $h^{16}$, whose upper surface is sloped to form an inclined plane arranged to engage the laterally-projecting lug $h^4$ of its corresponding hammer H⁵ to H⁸, the purpose of which will be hereinafter explained.

The shaft H is oscillated by means of a crank $h^{17}$ and connecting-rod $h^{18}$ from a double crank I' on a crank-shaft I, which is journaled in the casing-standards and extends the full length of the machine. (See Figs. 6, 7, 8, and 9.) The shaft I is provided between the casing-standards A' and A² with a gear-wheel $i$, operated from the gear-wheel $g$ on the shaft G through intermediate gearing, as will be more particularly explained hereinafter. (See Fig. 5.) For each rotation of the shaft I the oscillating shaft H makes one complete oscillation—that is to say, it moves from its initial position to its extreme position and then back to its initial position at each revolution of said shaft I.

The operation of the mechanism thus far described is as follows: When the machine is in its initial position, the parts appear as shown in Figs. 1 and 45. If now a key D be pressed—for example, the ninth key of the first set—the corresponding sector E' will be swung forward, thereby also pushing forward the corresponding locking-plate F' and locking all the keys of the set. At the same time the arm $f^4$ of the detent drops behind the locking-plate and holds it in its locking position, thus preventing the return of the depressed key and also rendering it impossible to depress any other key of the set. (See Fig. 2.) The crank G' is now turned one revolution, and thereby the shaft G and gear-wheel $g$ are rotated, the gear-wheel $i$ and the shaft I also being rotated through the intervention of the gear-wheels intermediate the gear-wheels $g$ and $i$. The rotation of the shaft I causes the shaft H to make one complete oscillation through the medium of the double crank I', the connecting-rod $h^{18}$, and the crank $h^{17}$. At the first half of the oscillation of the shaft H the carriers H⁹, H¹⁰, H¹¹, and H¹² are swung backward to such an extent that the recess at the front of the carriers comes directly beneath the downward-extending teeth $h^3$ of their respective hammers. (See Fig. 3.) When the key D was pressed and the corresponding sector E' moved forward, the dog H¹³ was swung on its fulcrum, so that its laterally-projecting lug $h^{16}$ was retracted from the lateral lug $h^4$ of its hammers, thus allowing the latter to drop, so that its tooth $h^3$ rested upon the back $h^{10}$ of its carrier H⁹, as shown in Fig. 2. Therefore when this carrier arrives with its recess beneath the tooth $h^3$ of the hammer the said tooth drops into said recess, its rear face or edge being in engagement with the shoulder $h^{11}$ of said carrier, as shown in Fig. 3. At the next half-oscillation of the shaft H the carrier H⁹ moves forward, and as the hammer H⁵ is in engagement with said carrier the said hammer is also moved forward, thereby moving the master gear-wheel H', to which it is pivoted. As the hammer is moved forward by the carrier the front face of its head $h^6$ comes into contact with the end of the depressed key, which stops any further forward movement of said hammer and causes the latter to lift upward, so that its tooth $h^3$ leaves the recess in the carrier H⁹, slipping off the shoulder $h^{11}$, this lifting movement of the hammer causing its laterally-projecting lug $h^5$ to enter a notch—in the present instance the ninth—in the corresponding locking-flange $e^3$, the locations of these notches being such that this is possible. (See Figs. 4 and 46.) In this way the master gear-wheel H' will be turned about its axis to an extent depending upon the key which is depressed, the location of the keys being at such intervals that the movement of the master gear-wheel H' will be proportional to the key depressed. When no key is depressed, if the crank G' is turned the carrier H⁹ merely moves backward and then forward without engaging the hammer, since the latter is retained in its elevated position by the inclined surface of the laterally-projecting lug $h^{16}$ on the dog $H^{13}$, as will be understood from Fig. 1. So soon as a hammer has struck a depressed key and has been lifted the carrier is free to complete its forward movement, again arriving at its initial position, when it stops until the next operation of the machine, the hammer also stopping in its raised position in the corresponding notch of the locking-flange until the next operation of the machine, as shown in Fig. 4. Upon the next use of the machine the shaft H makes one complete oscillation, as before, and during the first half of the oscillation the carrier H⁹ moves rearward. So soon as its recess comes beneath the tooth $h^3$ of the hammer the latter drops into said recess, thus freeing the lateral lug $h^5$ of the hammer from the notch of the locking-flange $c^3$. The rearward movement of the carrier causes its rear end to come into contact with a pin $h^{19}$, projecting laterally from the respective master gear-wheel H', thus moving said gear-wheel and its attached hammer back to its initial position. One of these pins $h^{19}$ is shown in dotted lines in Figs. 1 to 4. In this backward movement if a key has been depressed this will not interfere with the movement of the hammer, because the head $h^6$ of the latter will yield, turning on its pivot-pin $h^7$ against the tension of the spring $h^9$, and thus slip past the end of the depressed key. If no key in the set of keys under consideration was depressed, the sector and its dog $H^{13}$ to $H^{16}$ will be in their initial positions, so that the laterally-projecting lug $h^4$ of the hammer will ride up the incline of the lug $h^{16}$ of the dog, and thus the lug $h^5$ of the hammer will be caused to enter the rearmost or zero notch of the locking-flange $c^3$, thereby freeing the hammer from its carrier H⁹, so that upon the next forward movement of the carrier the hammer will not be carried forward with it. If, however, a key was depressed, the dog $H^{13}$ to $H^{16}$ will not be in its initial position and the hammer will not be lifted out of engagement with the carrier. Hence on the return movement of the carrier toward its initial position the hammer will be carried forward again until it contacts with the depressed key, when it will be lifted and held, as before described, thus causing the master gear-wheel to be moved to a certain extent and then stopped, while the carrier continues to move forward to its initial position. The rotation of the shaft G and of the gear-wheel $g$ causes the rotation of the gear-wheel $f^{10}$ and the short cam-shaft F⁶, whose cam $f^9$ is so located that at the end of the last half of the oscillation of the carriers and shaft H said cam $f^9$ will contact with the cam $f^8$, and thereby rock the trip-shaft F⁵, thus causing its trip-arms $f^7$ to engage and rock the arms $f^5$ of the detents, whose other arms $f^4$ are thereby lifted from behind the ends of the locking-plates F' to F⁴, whereby the latter may return to their initial positions under the influence of their respective springs $f^2$. This movement of the locking-plates releases the keys, so that those which have been depressed are raised by their respective springs D' and the apparatus is ready for use again. The return of the locking-plates to their initial positions also causes the return of the sectors E' to E⁴ to their initial positions, because of the fact that each locking-plate contacts with and pushes rearward the upward-extending lug $e^3$ of its respective sector.

From the description thus far it will be obvious that the carriers H⁹ to H¹² oscillate simultaneously through a fixed arc, whereas the hammers H⁵ to H⁸, inclusive, and the master gear-wheels H' to H⁴, inclusive, to which they are attached, move only when keys of their respective sets are depressed and then only to an extent determined by their respective depressed keys. The variable movements of the master gear-wheels H' to H⁴, inclusive, are employed to actuate the recording mechanism, the indicating mechanism, and the adding mechanism.

The recording mechanism is constructed as follows: J, Figs. 7, 18, and 19, is a shaft journaled at one end in the casing-standard A' and at the other end, which projects beyond the casing-standard A⁵, in the outer wall $j$ of a recorder-casing. The end of the shaft J between the casing-standards A' and A² is provided with a gear-wheel $j'$ in mesh with the gear-wheel $f^{10}$ and $i$, Fig. 5, whereby the shaft J is rotated at each revolution of the crank-shaft G. The gear-wheels $f^{10}$ and $j'$ form the intermediate gearing between the gear-wheels $g$ and $i$, which has been referred to hereinbefore as serving to transmit motion from the crank-shaft G to the shaft I. Surrounding the shaft J are a series of concentric tubular printing-wheel shafts J', J², J³, and J⁴, whose lengths decrease from the inner one to the outer one, as best shown in Fig. 19. Each of these printing-wheel shafts is provided at one end with a toothed double sector or mutilated gear-wheel, as shown at J⁵ to J⁸, Figs. 7 and 19, the other end of each printing-wheel shaft being provided with a printing wheel or sector J⁹ J¹⁰ J¹¹ J¹², each printing-sector having type with the numbers and characters from "0" to "9," inclusive. One of said printing-sectors is shown in detail in Fig. 22. Each mutilated gear-wheel J⁵ to J⁸ is operated by its corresponding master gear-wheel H' to H⁴ through the intervention of an idler-pinion, these idler-pinions being indicated at $j^2 j^3 j^4 j^5$, Fig. 7, and being mounted loosely on studs fixed in the respective casing-standards. (See also Figs. 1 to 4.) Upon the outer end of the outer tubular printing-wheel shaft $J^4$ is journaled one link K of an inking mechanism, another link K' being journaled upon the end of the shaft J, these two links being pivoted to and supporting one end of an ink-pad carrier $K^2$, which is best shown in Fig. 26. The ink-pad carrier $K^2$ has a lug $k$, provided with a stud $k'$, and, furthermore, is provided with an ink-pad $k^2$. The outer link K' carries a roller $k^3$, projecting laterally from said link, as shown in Fig. 26. The outer wall $j$ of the recorder-casing has an ear at one corner, as indicated at $j^6$, Fig. 17, and to this ear is pivotally attached a printing-platen $K^3$, Fig. 24, the said platen having a side rail $k^4$ and a cushion $k^5$, adjustable toward and from the type-sectors by means of adjusting-screws $k^6$, Fig. 19. The side rail $k^4$ is pivotally connected at one end to the ear $j^6$ of the outer wall of the recorder-casing $j$ by a screw $k^7$, and at its other end is pivotally connected by a screw $k^8$ to the end of a lifting-arm $K^4$, Figs. 17 and 23, which is provided with a slot $k^9$, through which passes the end of the shaft J, as shown in Fig. 19, the said lifting-arm being provided above the said shaft with a roller $k^{10}$. The lifting-arm has also a notch $k^{11}$, which receives the roller $k^3$ of the outer link K' of the inking mechanism. At the extreme outer end of the shaft J, which projects beyond the outer wall $j$ of the recorder-casing, is secured a platen-operating cam $K^5$, of Figs. 17, 18, 19, and 25, which has a lifting edge or face $k^{12}$ and a return channel or groove $k^{13}$, formed in the lower body of the cam. This cam $K^5$ is arranged to engage the roller $k^{10}$ of the lifting-arm and when rotated by the rotation of the shaft J will first raise the lifting-arm $K^4$, thereby drawing the platen toward the type-sectors, and then when it has turned so that said roller $k^{10}$ enters the groove $k^{13}$ will force said arm $K^4$ downward. When the lifting-arm $K^4$ is raised, it will swing the outer link K' of the inking mechanism, owing to the engagement of the notch $k^{11}$ of the lifting-arm with the roller $k^3$ of the outer link K', whereby the ink-pad carrier will be oscillated upward out of the way of the platen $K^3$. Upon the shaft J between the outer type-sector and the outer link K' is fixed an inking-cam $k^{14}$, Figs. 19 and 20, arranged to engage a pin $k^{15}$ in one arm $k^{16}$ of a bell-crank lever, whose other arm $k^{17}$ has a beveled or inclined face $k^{18}$, adapted to engage the stud $k'$ on the ink-pad carrier $K^2$. (See Fig. 21.)

The parts are so constructed that when the crank G' has made nearly three-fourths of a revolution the ink-pad $k^2$ will be directly under the type characters of the type-sectors which are then at the printing-point, as shown in Fig. 17. These type characters are the zero characters of the sectors. When the mutilated gear-wheels $J^5$ to $J^8$, inclusive, or any one of them, are moved by the variable movements of their corresponding master gear-wheels H' to $H^4$, produced as hereinbefore explained, they stop at positions corresponding to the points at which the respective hammers $H^9$ to $R^{12}$ have stopped in engagement with the respective notches of the locking-flanges, as previously pointed out hereinbefore. Such movements of the respective mutilated gear-wheels will bring to the printing-point the proper type characters of the printing-sectors, and at this moment the inking-cam $k^{14}$ will strike the pin $k^{15}$ and move the bell-crank lever so as to lift the ink-pad carrier $K^2$, and thereby ink the type which are then at the printing-point. The further rotation of the shaft J carries the inking-cam $k^{14}$ clear of the pin $k^{15}$, and the ink-pad carrier drops down away from the type. Immediately thereafter the cam $K^5$ commences to raise the lifting-arm $K^4$, as at this time the roller $k^{10}$ commences to ride up the lifting-face $k^{12}$ of said cam $K^5$. As the arm $K^4$ rises it quickly swings the inking mechanism out of the way of the platen, and the latter is brought up with the paper strip which it carries, as explained hereinafter, against the inked type, thereby making the desired impression. A slight further rotation of the shaft J causes the platen to be forced downward to a slight extent, owing to the passage of the roller $k^{10}$ beyond the maximum radius of the cam. The parts remain in this position until the next operation of the machine.

The paper supporting and feeding mechanism is as follows: To the bottom of the printing-platen $K^3$ is attached a hanger $k^{19}$, Fig. 24, provided with a threaded hole $k^{20}$, into which may be screwed a spindle $k^{21}$, carrying a bobbin or paper-reel $k^{22}$, on which is wound the blank paper strip $k^{23}$, Figs. 17 to 19, the said strip being led over the face of the platen $K^3$ to a winding-up reel $k^{24}$, whose spindle $k^{25}$ is screwed into the casing-standard $A^5$. The winding-up reel is provided with a ratchet-wheel $k^{26}$, engaged by a brake-pawl $k^{27}$, pressed by a spring $k^{28}$, fixed to the casing-standard $A^5$, as will be clear from Figs. 17 and 18. The said ratchet-wheel $k^{26}$ is also engaged by a winding-up pawl $k^{29}$, Figs. 17 and 24, pivotally connected to the hanger $k^{19}$ of the printing-platen $K^3$, said pawl $k^{29}$ being pressed downward by a spring $k^{30}$, fixed to said hanger. The hanger is also provided with a yielding friction brake or finger $k^{31}$, having a slightly-roughened surface, as shown in Fig. 24, arranged to bear against the side of the roll of blank paper, and thus prevent overrunning of said paper.

The operation of the paper-feeding mechanism is as follows: When the platen $K^3$ is forced away from the type, the pawl $k^{29}$ rotates the ratchet-wheel $k^{26}$, and thereby winds up the paper strip to an extent sufficient to bring a fresh surface of the paper into position to be printed on at the next operation. The pawl $k^{27}$ prevents the paper strip from being unwound from the winding-up reel $k^{24}$ at the next printing operation. To protect and hide the end of the shaft J and its attached mechanism, a cap $k^{32}$, Figs. 18 and 19, is screwed to the outer wall $j$ of the recorder-casing.

For the purpose of convenient attachment of the mutilated gear-wheels $J^5$ to $J^8$ to their respective tubular shafts $J'$ to $J^4$ the said wheels are provided with split hubs, having ears which are drawn toward each other by screws, as will be clear from Figs. 1 to 4.

The indicating mechanism comprises the following: L is a shaft journaled in the upper part of the casing-standards $A^2 A^5$, and upon this are mounted tubular shafts $L' L^2 L^3$ of different lengths, as shown in Fig. 7, these indicator-shafts $L L' L^2 L^3$ decreasing in length from the inner one to the outer one. At each end of each indicator-shaft is secured an indicator-drum, these drums being shown at $L^4$ to $L^{11}$, inclusive, Fig. 7. Of these indicator-drums $L^4$ and $L^{11}$ form a pair, $L^5$ and $L^{10}$ another pair, $L^6$ and $L^9$ still another pair, and $L^7$ and $L^8$ a fourth pair. All those drums which are fixed at the right-hand ends of their indicator-shafts—viz., the drums $L^4$ to $L^7$, inclusive, Fig. 7—form one set, the remaining drums forming a second set. The drums of the first set are provided with numbers and characters around their peripheries, running from "0" to "9," so arranged as to be read from the front of the machine through a window $l$, Fig. 8, in a front plate $l'$ of the machine-casing, only one number or character of a drum being visible at a time, the location of the said numbers and characters on each drum being such that the visible one will correspond to and indicate the extent to which the respective master gear-wheel $H'$ to $H^4$ has been moved, or, in other words, the position of the corresponding hammer with relation to the notches of the corresponding locking-flange $c^3$. The other indicator-drums $L^8$ to $L^{11}$ are provided with similar characters and numbers arranged, however, in a reverse order, so as to be read from the back of the machine through a suitable window $l^2$, Fig. 6, in the back-plate $l^3$ of the casing. Each drum is provided with a hub $l^4$, by which it is secured to its respective indicator-shaft, preferably by means of a pin passing through the hub and shaft, as shown at $l^5$, Fig. 7. Upon the hubs of the first set of drums are fixed pinions $l^6 l^7 l^8 l^9$ in mesh with the corresponding mutilated gear-wheels $J^5$ to $J^8$, inclusive, as shown in Figs. 1 and 7, whereby the variable movements of the master gear-wheels $H'$ to $H^4$, inclusive, are transmitted to the drums. Upon the hubs of the drums of the second set are fixed star-wheels $l^{10} l^{11} l^{12} l^{13}$, the first being engaged by a detent $l^{14}$, the last by a detent $l^{15}$, and the two intermediate ones, $l^{11} l^{12}$, by a detent $l^{16}$, as shown in Figs. 6 and 7. The detents $l^{14}$ to $l^{16}$, inclusive, are fixed to a detent-shaft $L^{12}$, journaled in the casing-standards $A' A^2 A^5$ and provided with an arm $l^{17}$, having a roller $l^{18}$, Fig. 5, arranged to be engaged by a cam $l^{19}$, fixed on the shaft J. The arrangement of these parts is such that the cam $l^{19}$ engages and presses outward the arm $l^{17}$ just as the machine is completing its operation, whereby the detents $l^{14}$ to $l^{16}$ are pushed into engagement with their respective star-wheels $l^{10}$ to $l^{13}$ and held in this position until the beginning of the next operation of the machine, thus locking the drums, when the machine is at rest, and unlocking said drums at the commencement of a new operation of the machine. Furthermore, if by lost motion in the various parts the drums should have a tendency not to come exactly to their proper indicating positions the detents and star-wheels will correct this evil and cause said drums always to show clearly the proper indication.

The operation of the indicating mechanism is as follows: When the master gear-wheels $H'$ to $H^4$ are oscillated, as hereinbefore described, this movement is transmitted, through the idler-pinions $j^2$ to $j^5$ and mutilated gear-wheels $J^5$ to $J^8$, to the pinions $l^6$ to $l^9$, whereby the indicator-shafts $L$ to $L^3$ and the drums $L^4$ to $L^{11}$ are oscillated, the drums finally coming to rest at positions corresponding to the positions at which the respective hammers $H^5$ to $H^8$ come to rest, whereupon the indicator-drums are locked in their positions by the detents $l^{14}$ to $l^{16}$.

The adding mechanism is self-contained, its main framework comprising two end plates M, Figs. 10 to 13, and 40, connected by longitudinal bars $M' M^2 M^3$, Figs. 12, 13, and 40, the first two being provided with end flanges $m$, screwed to the end plates by screws $m'$, while the latter bar $M^3$ is held by screws $m^2$, which pass through the end plates into threaded holes in the ends of said bar $M^3$. (See Fig. 40.) The bars $M' M^2$ are provided with downward-extending lugs $m^3$, at one side of each of which said bars are grooved, as indicated at $m^4$, Figs. 12 and 13. In the end plates M is journaled a shaft $M^4$, on which are loosely mounted a series of pinions $M^5 M^6 M^7 M^8$, having long hubs $m^5$, as shown in Fig. 12, and between the hubs of the respective pinions are placed cams $M^9 M^{10} M^{11} M^{12}$, each fixed to the shaft $M^4$ in any suitable way, as by a pin $m^6$, these cams being each provided with a cam finger or nose $m^7$, as shown in Fig. 11. The cams $M^9$ to $M^{12}$ are so located on the shaft $M^4$ that their cam-fingers will be ninety degrees apart, as will be clear from Fig. 11. The pinions $M^5$ to $M^8$ are in mesh with the master gear-wheels $H'$ to $H^4$, whereby they receive a variable motion from said gear-wheels. They are also in mesh with a series of pinions $M^{13} M^{14} M^{15} M^{16}$, Fig. 10, each of which is loosely mounted on a sleeve or hub $m^8$, Fig. 13, of a corresponding number-wheel, these number-wheels being indicated at $M^{17} M^{18} M^{19}$ $M^{20}$. The said number-wheels and one extra one, $M^{21}$, are loosely mounted on a number-wheel shaft $M^{22}$, journaled in the end plates M. To the pinions $M^{13}$ to $M^{16}$ are attached ratchet-wheels $M^{23}$ $M^{24}$ $M^{25}$ $M^{26}$, Fig. 13, also loosely mounted on the respective hubs $m^8$ of the number-wheels, said ratchet-wheels being attached to the pinions $M^{13}$ to $M^{16}$ by two screws $m^9$, Fig. 44. The web of each number-wheel is provided with a spring-pressed pawl $m^{10}$, Fig. 44, which engages the respective ratchet-wheels $M^{23}$ to $M^{26}$, thus locking the number-wheel to the ratchet-wheel when the latter is rotated in one direction and yet allowing the number-wheel to remain stationary when the ratchet-wheel rotates in the other direction. To that end of each hub $m^8$ which projects beyond the respective pinion $M^{13}$ to $M^{16}$ is fixed a cam $M^{27}$ $M^{28}$ $M^{29}$ $M^{30}$, Fig. 13, one of which is shown in detail in Fig. 42, the cams being secured to the hubs $m^8$ in any suitable way, as by pins $m^{11}$, and having a laterally-projecting pin $m^{12}$. To each number-wheel $M^{17}$ to $M^{21}$ is attached a ratchet-wheel, these being indicated at $M^{31}$, $M^{32}$, $M^{33}$, $M^{34}$, and $M^{35}$, Fig. 13, one being shown in detail in Figs. 39 and 40. Each of said ratchet-wheels is secured to its number-wheel by two screws $m^{13}$, Fig. 39, and has a recess $m^{14}$, Fig. 40, within which is located a spring-pressed pawl $m^{15}$, all of the said pawls engaging a V-shaped slot $m^{16}$ in the number-wheel shaft $M^{22}$, as shown in Figs. 40 and 41. The ratchet-wheels $M^{31}$ to $M^{35}$ are engaged by pawls $M^{36}$ $M^{37}$ $M^{38}$ $M^{39}$ $M^{40}$, Figs. 13, 39, and 40, mounted on a shaft $M^{41}$, journaled in the end plates M, each pawl being drawn yieldingly against its ratchet-wheel by means of a spring $m^{17}$, fixed at one end to its pawl and at the other end to a rod $m^{18}$, extending from one end plate M to the other.

The number-wheel shaft $M^{22}$ extends through the casing-standard A', as shown in Fig. 13, and is provided with a square opening $m^{19}$, Fig. 41, in its end for the insertion of a key by which it may be turned for the purpose of setting the adding mechanism to zero, as fully explained hereinafter.

The grooves $m^4$ of the longitudinal bars M' $M^2$ are in line with each other; but the downward-extending lugs $m^3$ of said bars are on opposite sides of the respective grooves—that is to say, the lugs $m^3$ of the bar M' are on the right side of the grooves $m^4$ of said bar, as shown in Fig. 13, while the lugs $m^3$ of the bar $M^2$ are on the left side of the grooves $m^4$ of said bar, as shown in Fig. 12. This relative arrangement of the grooves and lugs is also shown in Fig. 10.

In each pair of alined grooves of the bars M' $M^2$ is mounted a longitudinally-movable slide-plate N' $N^2$ $N^3$ $N^4$, as shown in Figs. 10, 37, and 39. Each slide-plate is attached to the corresponding lugs $m^3$ of the strips M' $M^2$ by screws $m^{20}$, which pass through slots $n$ in said slide-plate. Each slide-plate is also provided with a downward-extending ear $n'$ at its rear end, said ear having a slot $n^2$ for a purpose hereinafter pointed out. Each slide-plate also has a pawl $N^5$ $N^6$ $N^7$ $N^8$, these pawls being arranged to engage the ratchet-wheels $M^{32}$ $M^{33}$ $M^{34}$ $M^{35}$, respectively, of the number-wheels $M^{18}$ to $M^{21}$. Each slide-plate is provided with a pin $n^3$, arranged for engagement with the corresponding cam $M^9$ to $M^{12}$ of the shaft $M^4$.

Upon a shaft O, Figs. 12, 36, and 37, which is journaled in the end plates M, are mounted double-armed levers O' $O^2$ $O^3$ $O^4$, each having one arm $o'$ provided with a lug $o^2$, arranged to project into the path of the pin $m^{12}$ of its corresponding cam $M^{27}$ to $M^{30}$, the other arm $o^3$ being provided with a pin $o^4$, projecting into the slot $n^2$ in the slide-plate, which lies to the left of such double-armed lever, as will be clear from Fig. 36.

One end of the shaft $M^4$ projects beyond the casing-standard A' and the end plate M, and to this projecting end is secured a notched stop wheel or disk P, Figs. 12 and 38, having a long hub or sleeve $p$, secured to the shaft $M^4$ by a pin $p'$. The notch of this stop-wheel is engaged by a pawl P', pivoted on a screw $p^2$, threaded into the end plate M, said pawl being pressed by a spring $p^3$, fixed to said end plate M. Upon the sleeve or hub $p$ of the stop-wheel is loosely mounted a pinion $P^2$, Figs. 12, 32, 33, and 35, having a side flange $p^4$, to the outer face of which is pivoted a pawl $p^5$ by means of a screw $p^6$, said pawl being pressed by a spring $p^7$, fixed to a post $p^8$, secured in the side flange $p^4$ of the pinion $P^2$. The pawl $p^5$ enters a notch-disk or stop-wheel $P^3$, which is fixed upon the outer end of the hub or sleeve $p$ of the stop-wheel P by a pin $p^9$. The pinion $P^2$ is in mesh with a toothed sector $P^4$, fixed upon the oscillating shaft H, as will be clear from Figs. 5 and 12.

Each number-wheel is provided with characters and numbers "0" to "9," as indicated at $m^{21}$, Fig. 43, and the casing of the adding mechanism is provided with a front plate Q, Fig. 1, having an opening $q$, through which the proper-alined numbers and characters, one on each number-wheel, may be read.

The operation of the adding mechanism is as follows: During the first half-turn of the hand-crank G' any movement of the master gear-wheels H' to $H^5$, which engage the pinions $M^5$ to $M^8$, and thereby rotate the corresponding pinions $M^{13}$ to $M^{16}$, will not rotate the number-wheels, but will cause the ratchet-wheels $M^{23}$ to $M^{26}$ to slip beneath the pawls $m^{10}$ of each ratchet-wheel, the number-wheels being held against any rotation due to friction by means of the pawls $M^{36}$ to $M^{40}$, which engage the other ratchet-wheels $M^{31}$ to $M^{35}$, fixed to said number-wheels. When the hand-crank G' makes its second half-revolution and the master gear-wheels H' to $H^4$ are oscillated in the opposite direction to an extent dependent upon the keys depressed, as has previously been explained, this movement is transmitted to the number-wheels by the pinions $M^5$ to $M^8$ and $M^{13}$ to $M^{16}$, the ratchet-wheels $M^{23}$ to $M^{26}$, which in this direction of movement engage and lock with the respective pawls $m^{10}$ of the number-wheels and force the same around, each number-wheel moving to an extent proportional to the amount of oscillation of its respective master gear-wheel $H'$ to $H^4$. At this movement the ratchet-wheels $M^{31}$ to $M^{35}$ slip around beneath their respective pawls $M^{16}$ to $M^{10}$ and also beneath the respective pawls $N^5$ to $N^8$ of the slide-plates $N'$ to $N^4$. If the movements imparted by this operation of the machine to the respective number-wheels do not bring any of them past a position where the number "9" appears at the sight-opening $q$ of the front plate $Q$ of the adding mechanism, no further action of the number-wheels takes place, but they stop with the stopping of the master gear-wheels $H'$ to $H^4$ and indicate the proper total at said sight-opening $q$. During the operation of the crank-handle $G'$ the oscillation of the shaft $H$ causes an oscillation of the toothed sector $P^4$, and this being in mesh with the pinion $P^2$ on the shaft $M^4$ causes a corresponding movement of the said pinion $P^2$ first in one direction and then in the other. During the first half oscillation of the toothed sector $P^4$ the pinion $P^2$ rotates in its first direction and causes a rotation of the shaft $M^4$, owing to the fact that the pawl $p^5$ locks to the stop-wheel $P^3$, during which movement the other stop-wheel $P$ slips around beneath its own pawl $P'$ one complete rotation, at the end of which the notch again comes beneath the pawl $P'$, which enters it. The shaft $M^4$ is not rotated during the last half of this oscillation, because it is held by the pawl $P'$, which locks the stop-wheel $P$, the pinion $P^2$ carrying its pawl $p^5$ idly around over the periphery of the stop-wheel $P^3$ until it again enters the notch in said stop-wheel $P^3$. Under the circumstances assumed above with relation to the number-wheels—viz., that none indicates higher than the number "9"—the rotation of the shaft $M^4$ has no effect other than to carry the cams $M^9$ to $M^{12}$ around idly. If, however, any number-wheel has been moved past the position in which it would indicate the number "9" at the sight-opening $q$, the carrying of the tens occurs, as will now be explained. When any number-wheel except the extra number-wheel $M^{21}$ is moved past its position to indicate "9," the pin $m^{12}$ of its respective cam $M^{27}$ to $M^{30}$ engages the lug $o^2$ of the corresponding double-armed lever $O'$ to $O^4$, and thereby moves the same, which movement, owing to the fact that the pin $o^4$ is in the slot $n^2$ of the corresponding slide-plate $N'$ to $N^4$, slides said plate backward, its pawl $N^5$ to $N^8$ slipping over the teeth of the ratchet-wheel $M^{32}$ to $M^{35}$, with which it is in engagement. When the slide-plate reaches its position to the rear, its pin $n^3$ is in the path of the corresponding cam $M^9$ to $M^{12}$ on the shaft $M^4$. Consequently the rotation of said shaft by the toothed sector $P^4$, as hereinbefore explained, causes the said cam $M^9$ to $M^{12}$ to engage the pin $n^3$ and slide the plate forward again, its pawl $N^5$ to $N^8$ moving the ratchet-wheel $M^{32}$ to $M^{35}$, with which it is in engagement, to an extent sufficient to turn the number-wheel of said ratchet-wheel one number. As the cams $M^9$ to $M^{12}$ are set at angles from each other, (in the present instance at angles of ninety degrees,) this carrying of the tens is done consecutively throughout the whole set of number-wheels. When it is desired to set the number-wheels at zero, a key having a square end is inserted in the square opening $m^{19}$ in the end of the number-wheel shaft $M^{22}$, and the shaft is rotated until first one, then another, and finally all the pawls $m^{15}$ of the ratchet-wheels $M^{31}$ to $M^{35}$ are in engagement with the groove or slot $m^{16}$ of said shaft $M^{22}$. Thereafter the turning of said shaft will turn the number-wheels and they are moved around until they indicate "99990." The pawl $m^{15}$ of the units number-wheel $M^{17}$ is so located with relation to the pawls $m^{15}$ of the other number-wheels that this can be done. In other words, when all the number-wheels have their pawls $m^{15}$ in engagement with the groove $m^{16}$ of the number-wheel shaft $M^{22}$ the characters and numbers on the number-wheel $M^{17}$ are one number ahead of the characters and numbers of the other number-wheels. If now the crank-handle $G'$ be turned without depressing any of the keys $D$, the carrying of the tens will occur on all the number-wheels except the first—that is to say, the four highest number-wheels will each be moved one number farther—viz., from "9" to "0"—and thus all number-wheels will indicate "0."

The machine is provided with a suitable end casing-plate $R$, Fig. 48, through which the crank-shaft $G$ projects. This end casing-plate $R$ may be provided also with a stop $r$, engaged by a spring-bolt $r'$ in the handle of the crank $G'$ to determine the initial position of the crank $G'$, as will be fully understood by those skilled in the art. The end carrying-plate $R$ is also provided with an opening opposite the end of the shaft $M^{22}$, through which the key may be inserted for setting the adding mechanism to zero.

Having thus fully described my invention, what I claim is—

1. The combination, with casing-standards each having an upper and lower flange, the flanges of one standard projecting toward the flanges of the other standard, said flanges having key-notches, of a guide-strip secured to the flanges of both standards, keys located in said key-notches, springs surrounding said keys intermediate the upper and lower flanges of the respective casing-standards, and pins inserted in said keys above said springs and arranged to strike the upper flanges of the respective standards.

2. The combination, with a plurality of keys having notches, a locking-plate arranged to engage said notches, and yielding means for holding said locking-plate out of engagement with the keys, of an oscillating sector arranged to be swung by the depression of a key, and means operated by the sector and arranged to move the locking-plate to lock the keys.

3. The combination of an oscillating shaft, a carrier fixed thereto, a master-wheel mounted loosely thereon, a hammer pivoted to the master-wheel and arranged to be engaged by the carrier to move the master-wheel in one direction, and a stop on the side of the master-wheel arranged to be struck by the carrier after the hammer is disengaged therefrom to move the wheel in the opposite direction.

4. The combination, with an oscillating shaft, a carrier fixed thereto and having a shoulder, a master-wheel, and a hammer pivoted to said master-wheel and arranged to engage the shoulder of the carrier, of a plurality of keys each arranged to be depressed into the path of the hammer to release the same from the carrier, and a stop device upon the master-wheel arranged to be struck by the carrier.

5. The combination, with an oscillating shaft, a carrier fixed thereto and provided with a shoulder, a master-wheel loosely journaled on said shaft, and a stop device mounted on said master-wheel and arranged to be engaged by the carrier, of a hammer pivotally connected to the master-wheel and arranged to engage the shoulder of the carrier, means for limiting the movement of the hammer, and a plurality of keys arranged to disengage the hammer from the carrier.

6. The combination, with a master-wheel, a carrier, and means for oscillating the carrier through a predetermined arc, of a hammer pivoted to the master-wheel and arranged to engage the carrier, means for releasing the hammer from the carrier at a predetermined point of its arc, keys arranged to be depressed into the path of the hammer for lifting said hammer from the carrier at varying points in its arc, and mechanism intermediate the keys and the hammer-releasing means whereby the latter is held out of operation during the depression of a key.

7. The combination of a sector having a limited oscillatory movement, a master-wheel, a carrier, a hammer carried by the master-wheel and arranged to be engaged by the carrier, and a dog controlled by the sector and normally supporting the hammer out of the path of the carrier.

8. The combination of the master-wheel, a hammer carried thereby, a carrier arranged to engage the hammer, a sector, and a dog pivotally supported at one side of the sector and having a depending arm connected with the sector and provided with a lateral shoulder arranged to engage and support the hammer.

9. The combination of a master-wheel, a hammer pivoted thereto, means on the wheel for arresting the movement of the hammer, a carrier arranged to engage the hammer, a vibratory sector, and a dog controlled by the sector and normally supporting the hammer out of the path of the carrier.

10. The combination of a master-wheel, a hammer pivoted thereto, a carrier arranged to engage said hammer, a vibratory sector having a recess in its rear edge, and a dog having its pivot extending through said recess, having a loose connection with the sector and normally holding the hammer out of the path of the carrier.

11. The combination of a master-wheel, a hammer pivoted thereto, a head pivotally mounted on the upper end of the hammer, a carrier arranged to engage the hammer, a sector, a dog controlled by the sector and normally holding the hammer out of the path of the carrier, and a key arranged to vibrate the sector and thereby release the dog from the hammer and permit the engagement of the hammer by the carrier.

12. The combination, with an oscillating sector having inclined notches, and a plurality of keys provided with pins arranged to enter the respective notches, whereby upon the depression of a key the sector is moved, of means operated by the movement of the sector for locking the keys, and a detent arranged to hold said means in its locking position.

13. The combination, with a locking-flange, a master-wheel, a hammer carried by the master-wheel and arranged to engage the locking-flange, and a carrier arranged to engage and move the hammer, of a dog arranged to release the hammer from the carrier and engage it with the locking-flange at the limit of the rearward movement of the hammer, and a key arranged to hold the dog out of action and upon the upward movement of the hammer itself release the hammer from the carrier.

14. The combination, with casing-standards having flanges projecting toward each other, a guide-strip secured to said flanges and provided with a locking-flange, a master-wheel, a hammer carried by said master-wheel and arranged to engage the locking-flange, and a carrier arranged to engage and move the hammer, of a key arranged to be depressed into the path of the hammer to release the same from the carrier and engage it with the locking-flange.

15. The combination of a bank of keys, each having two notches in its side, a locking-flange, means for holding said flange normally out of the path of the keys, and means for throwing said flange into the path of keys after a key has been depressed, whereby the flange will engage the upper notch in the depressed key and the lower notch in each of the other keys.

16. The combination of a bank of keys, a locking-flange arranged below the bank of keys, means for throwing said flange into engagement with the keys, a detent adapted to drop into engagement with the rear end of the locking-flange, a cam adapted to release the detent from the locking-flange, and means for operating said cam.

17. The combination, with a plurality of printing-wheel shafts, printing-wheels mounted thereon, and means for actuating said printing-wheel shafts to bring the printing-wheel type to the printing-point, of an operating-shaft, a cam on the same, an ink-pad carrier suspended from said shafts, means intermediate said carrier and the cam operated by the cam to raise the carrier against the type, and means for actuating the operating-shaft.

18. The combination with a plurality of printing-wheel shafts, printing-wheels mounted thereon, and means for bringing the printing-wheels to the printing-point, of a platen pivotally supported at one end below the printing-wheels, an operating-shaft, a cam on said shaft, an arm pivoted at its lower end to the free end of the platen and provided at its upper end with a pin engaging the cam on the operating-shaft, an inking-pad carrier having a connection with said arm whereby it is oscillated as the arm is raised and lowered, an inking-cam on the operating-shaft, and connections between said cam and the inking-pad carrier whereby the carrier is brought against the printing-wheels.

19. The combination of a plurality of printing-wheels, means for bringing the same to the printing-point, an operating-shaft, a platen, an arm connecting said platen and said cam and having a notch in one edge, a pair of oscillatory arms, an inking-pad carrier secured to said arms, and a pin on one of said arms engaging the notch in the arm connected to the platen.

20. The combination of an operating-shaft, an inking-cam thereon, an inking-pad carrier, means for oscillating said carrier, and a bell-crank lever having one end in engagement with the inking-cam and its other end in engagement with the carrier to raise the same.

In testimony whereof I affix my signature to this specification in the presence of two witnesses.

FRANCESCO SKERL.

Witnesses:
M. C. MASSIE,
PAUL TAUSIG.